US012756644B2

(12) United States Patent
Zhu et al.

(10) Patent No.: US 12,756,644 B2
(45) Date of Patent: Oct. 6, 2026

(54) CLOUD NETWORK, MEASUREMENT SYSTEM FOR CLOUD NETWORK , AND METHOD, DEVICE AND STORAGE MEDIUM

(71) Applicant: CLOUD INTELLIGENCE ASSETS HOLDING (SINGAPORE) PRIVATE LIMITED, Singapore (SG)

(72) Inventors: Shunmin Zhu, Hangzhou (CN); Biao Lyu, Hangzhou (CN); Jianyuan Lu, Beijing (CN); Daxiang Kang, Hangzhou (CN); Xiong Xiao, Hangzhou (CN); Lei Wang, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 312 days.

(21) Appl. No.: 18/559,434

(22) PCT Filed: May 5, 2022

(86) PCT No.: PCT/CN2022/090914
§ 371 (c)(1),
(2) Date: Nov. 7, 2023

(87) PCT Pub. No.: WO2022/233297
PCT Pub. Date: Nov. 10, 2022

(65) Prior Publication Data

US 2024/0235972 A1 Jul. 11, 2024

(30) Foreign Application Priority Data

May 7, 2021 (CN) ........................ 202110496812.X

(51) Int. Cl.
*H04L 43/08* (2022.01)
*H04L 41/40* (2022.01)
(Continued)

(52) U.S. Cl.
CPC .............. *H04L 43/08* (2013.01); *H04L 41/40* (2022.05); *H04L 43/20* (2022.05); *H04L 43/50* (2013.01)

(58) Field of Classification Search
CPC ......... H04L 43/08; H04L 43/20; H04L 43/50; H04L 43/55; H04L 43/0805; H04L 41/40
(Continued)

(56) References Cited

U.S. PATENT DOCUMENTS

2016/0134472 A1* 5/2016 Guan .................. H04L 43/0805
709/222
2019/0104051 A1* 4/2019 Cidon ..................... H04L 12/14
(Continued)

FOREIGN PATENT DOCUMENTS

CN 103491129 A 1/2014
CN 112532468 A 3/2021
CN 112994987 A 6/2021

OTHER PUBLICATIONS

English Translation of the International Search Report, Application No. PCT/CN2022/090914, Jul. 27, 2022, Pp. 3.

*Primary Examiner* — Jungwon Chang
(74) *Attorney, Agent, or Firm* — Osha Bergman Watanabe & Burton LLP

(57) ABSTRACT

A cloud network, a measurement system for the cloud network, and a method, a device and a storage medium. For a cloud network, by means of automatically perceiving a measurement intent of a tenant in the cloud network, generating a measurement rule that complies with the measurement intent, and delivering, on the basis of the measurement
(Continued)

rule and by means of bypass packet injection, a measurement request message into network element devices on a path to be measured, a network quality analysis is performed with the help of measurement record information generated when the measurement request message passes through different network element devices.

20 Claims, 6 Drawing Sheets

(51) Int. Cl.
*H04L 43/20* (2022.01)
*H04L 43/50* (2022.01)

(58) Field of Classification Search
USPC .......................................................... 370/241
See application file for complete search history.

(56) References Cited

U.S. PATENT DOCUMENTS

| | | | | |
|---|---|---|---|---|
| 2020/0092184 | A1* | 3/2020 | Park | H04L 43/55 |
| 2020/0381939 | A1* | 12/2020 | Wester | F24F 11/46 |
| 2021/0144517 | A1* | 5/2021 | Guim Bernat | G06F 9/5072 |
| 2022/0210036 | A1* | 6/2022 | Li | H04L 12/4641 |

* cited by examiner

CLOUD NETWORK, MEASUREMENT SYSTEM FOR CLOUD NETWORK , AND METHOD, DEVICE AND STORAGE MEDIUM

The present invention is filed under 35 U.S.C. § 371 as the U.S. national phase of International Patent Application No. PCT/CN2022/090914, filed May 5, 2022, which designated the United States and which claims the benefit of Chinese Patent Application No. 202110496812.X, filed on May 7, 2021, which is incorporated herein by reference in its entirety.

TECHNICAL FIELD

The present application relates to the field of cloud computing technology, and in particular to a cloud network, a measurement system for a cloud network, a method, a device and a storage medium.

BACKGROUND

Cloud network is a complex network that integrates a physical network and a virtual network, and the virtual network includes a multi-tenant network. Tenants' applications as well as connections and communications between the applications are hosted on the cloud network. An application request of a tenant will reach a destination end after being processed and transmitted via multiple-layer networks.

The network quality of a cloud network has a direct impact on tenants' applications. However, due to flexible and changeable characteristics of tenants and network topology of a cloud network, existing quality detection technology for a physical network is not suitable for the cloud network. In this case, it is very critical how to simply and accurately measure the network quality of a cloud network.

SUMMARY

Various aspects of the present application provide a cloud network, a measurement system for a cloud network, a method, a device and a storage medium, for simple and accurate measurement of the network quality of a could network.

An embodiment of the present application provides a cloud network, including a physical network and a virtual network hosted on the physical network; the virtual network including a multi-tenant network and network element devices responsible for traffic forwarding and interconnection between different end devices in the multi-tenant network; the cloud network further including a scheduling device and an analysis device; the scheduling device being configured for perceiving a measurement intent of a target tenant, generating a measurement rule that complies with the measurement intent and delivering the measurement rule to a source network element device, wherein the measurement rule includes a source end device and a destination end device on a path to be measured, and the source network element device is a network element device on the path to be measured; the source network element device being configured for generating a measurement request message according to the measurement rule and forwarding the measurement request message, wherein the measurement request message is used for enabling the source network element device and other network element devices on the path to be measured that receive the measurement request message to generate measurement record information; the analysis device being configured for performing network quality analysis according to the measurement record information generated by the source network element device and the other network element devices.

An embodiment of the present application further provides a measurement system for a cloud network, including a scheduling subsystem, at least one measurement execution subsystem and a measurement analysis subsystem; the scheduling subsystem being configured for perceiving a measurement intent of a target tenant in the cloud network, generating a measurement rule that complies with the measurement intent and delivering the measurement rule to a target measurement execution subsystem, wherein the measurement rule includes a source end device and a destination end device on a path to be measured, and the target measurement execution subsystem corresponds to the path to be measured; the target measurement execution subsystem being configured for generating a measurement request message according to the measurement rule, transmitting the measurement request message into the path to be measured, so that at least part of network element devices on the path to be measured forward the measurement request message and generate measurement record information; the measurement analysis subsystem being configured for performing network quality analysis according to the measurement record information generated by the at least part of network element devices.

An embodiment of the present application further provides a network quality measurement method, including: perceiving a measurement intent of a target tenant in a cloud network, and generating a measurement rule that complies with the measurement intent, wherein the measurement rule includes a source end device and a destination end device on a path to be measured; generating a measurement request message according to the measurement rule, and transmitting the measurement request message into the path to be measured, so that at least part of network element devices on the path to be measured generate measurement record information; performing network quality analysis according to the measurement record information generated by the at least part of network element devices.

An embodiment of the present application further provides a cloud computing device, including a memory and a processor, wherein the memory is used to store computer programs, and the processor is used to execute the computer programs to implement steps in the method embodiment of the present application.

An embodiment of the present application further provides a computer-readable storage medium storing computer programs, wherein the computer programs, when are executed by a processor, enable the processor to implement steps in the method embodiment of the present application.

An embodiment of the present application further provides a computer program product, including computer programs/instructions. The computer programs/instructions, when executed by a processor, enable the processor to implement steps in the method embodiment of the present application.

BRIEF DESCRIPTION OF THE DRAWINGS

Drawings illustrated here are used to provide a further understanding of the present application and constitute a part of the present application. The schematic embodiments of the present application and descriptions of the embodiments are used to explain the present application and do not constitute an improper limitation of the present application. In the drawings.

DETAILED DESCRIPTION

Figure 1A:
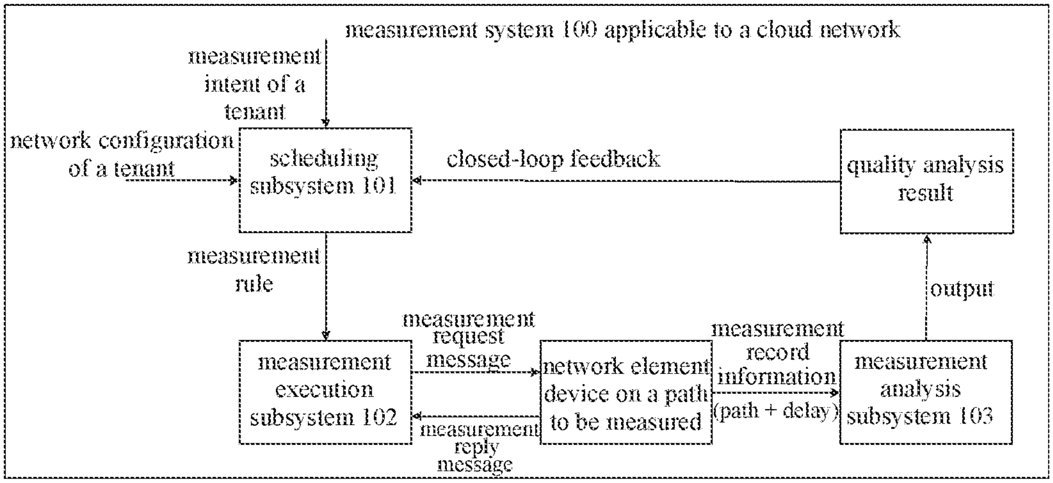
FIG. 1A is a schematic structural diagram of a measurement system for a cloud network provided by an exemplary embodiment of the present application.

In order to make the objects, technical solutions and advantages of the present application clearer, the technical solutions of the present application will be clearly and comprehensively described below in combination with the specific embodiments of the present application and corresponding drawings. It is obvious that the described embodiments are only some of the embodiments of the present application, rather than all of the embodiments. All other embodiments obtained based on the embodiments of the present application by those of ordinary skill in the art without any creative efforts shall fall within the protection scope of the present application.

For the existing technical problem that the network quality of a cloud network cannot be effectively measured, in some embodiments of the present application, a measurement system is provided, which may be used to, but is not limited to, measure the network quality of the cloud network. The measurement system may also be applied to a physical network to measure the network quality for the physical network. In a case where the measurement system is applied to a cloud network, the measurement system may perceive the measurement intent of a tenant in the cloud network, generate a measurement rule according to the measurement intent, and based on this measurement rule, transmit a measurement request message into a network element device on a path to be measured by applying the bypass packet injection method. By using measurement record information generated when the measurement request message passes through different network element devices to perform network quality analysis, the network quality of a cloud network can be measured simply, effectively, and accurately. In the following embodiments of the present application, the focus is on applying the measurement system to a cloud network as an example for explanation.

In embodiments of the present application, for a cloud network, by perceiving the measurement intent of a tenant in the cloud network, a measurement rule is generated according to the measurement intent, and based on this measurement rule, a measurement request message is transmitted into a network element device on a path to be measured by applying the bypass packet injection method. By using measurement record information generated when the measurement request message passes through different network element devices to perform network quality analysis, the network quality of a cloud network can be measured simply, effectively, and accurately.

Further, the measurement process is significantly simplified by making a measurement request of a tenant intentional, and the tenant is unaware of the measurement process. There is no need to perform management operations on complex measurement rules, which helps improve tenant's experiences. In addition, by means of the bypass packet injection method, there is no need to deploy measurement services in the tenant's network environment, which is beneficial to reducing intrusion into the tenant's network environment. Meanwhile, since the embodiments of the present application adopt the active packet injection, which can avoid the dependence on tenant's actual application traffic, and the network quality can be measured even in a case where the tenant does not generate any actual application traffic.

First, the cloud network is briefly introduced: the cloud network is a complex network that integrates a physical network and a virtual network, wherein the virtual network further includes a multi-tenant network. That is, the cloud network includes a physical network and a virtual network. The physical network includes physical machines such as servers, cabinets, routers, and switches, as well as physical connection lines used to realize network connections between these physical machines, for example, coaxial cables, network cables, optical fibers, etc. The virtual network is hosted on the physical network, which is a logical network implemented based on virtualization technology on the basis of the physical network. Physical network resources may be virtualized, so that the physical network resources can be upgraded to virtualized and dynamically allocatable virtualized resources.

In the embodiments of the present application, the virtual network includes a multi-tenant network, and network environments of different tenants are isolated from each other. Each tenant network includes but is not limited to: all data in the cloud network that may be used for identifying the tenant, such as various virtualized resources like an account created for the tenant and accounting data in the cloud network, as well as various data set for the tenant in the cloud network and a virtualized end device configured by the tenant, etc. In the embodiments of the present application, an end device in the tenant network refers to a virtualized device that can initiate or terminate network traffic. Generally, an end device can provide a completely isolated network environment for the tenant and is responsible for carrying the tenant's applications which will send and receive network traffic (such as various messages). The end device may be implemented in the form of, but not limited to: a virtual machine (VM), a container, an elastic compute service (ECS), and a configuration object for a subsequent network element device (such as a virtual switch), a cloud database, etc. A tenant generally refers to a user who uses a cloud network or various resources in the cloud network. In the present embodiment, no limitation is made to the implementation of the tenant network. For example, it may be implemented as a virtual private cloud (VPC). For tenants, they may deploy their own VMs, cloud databases and other end devices in their VPC.

In addition to the multi-tenant network, the virtual network further includes a network element device that implements traffic forwarding and network interconnection between different end devices in the multi-tenant network. In the embodiments of the present application, the network element device is mainly used to forward traffic between different end devices, perform message processing, and achieve network interconnection between different end devices which, for example, may be virtual switches, virtual gateways, etc. In an optional embodiment, overlay technology may be used to implement an overlay network in the virtual network. The overlay network is between the physical network and the tenant network, and the above network element device may be implemented in the overlay network. The overlay network is a bridge between the tenant network and the physical network, allowing the interconnection between the end devices in the tenant network to be free of constraints of the physical network, providing conditions for the ultimate realization of flexible definition, on-demand allocation, and on-demand adjustment of network resources. In this way, the entire cloud network may be implemented as a three-layer network architecture including the physical network, overlay network, and multi-tenant network, however, to which the division for a cloud network architecture is not limited. No matter which kind of network architecture is, by means of packaging configuration information of various resources in the virtual network and finally presenting to the tenant in the form of configuration objects, the tenant may accordingly configure the configuration objects according to their own needs, thereby obtaining an end device, a subnetwork and other resources that meet their own needs.

From the above introduction to the cloud network, it can be seen that network quality measurement for the cloud network is no longer limited to physical machines to physical machines, but needs to go deep inside virtualized end devices (such as virtual machines). The virtualized end devices are logical nodes, which have great differences from the deployment and topology of the physical machines. In a cloud network, compared with the topology of a physical network, the topology of a tenant network is flexible and changeable. According to different requirements of tenants, these virtualized end devices (such as virtual machines) may be flexibly added or reduced. Interconnection relationships between end devices and between end devices and other networks (such as private networks) may also be flexibly changed according to tenants' requirements. If the network quality of a cloud network is directly detected by a tenant, the tenant needs to perform complex measurement work, including deploying measurement services, managing measurement objects and measurement rules, etc. Moreover, these tasks also need to continuously adaptively changed according to the topology changes of the virtual network, which is a relatively arduous work for tenants, and it is quite difficult to measure the network quality. The measurement system provided by the embodiments of the present application can solve the technical problem of difficult network quality measurement of a cloud network.

Next, a measurement system provided by embodiments of the present application is introduced. As shown in FIG. 1A, a measurement system 100 provided by an embodiment of the present application that may be applied in a cloud network includes: a scheduling subsystem 101, at least one measurement execution subsystem 102, and a measurement analysis subsystem 103. Each measurement execution subsystem 102 is communicatively connected with the scheduling subsystem 101 and the measurement analysis subsystem 103 respectively. In the present embodiment, the scheduling subsystem 101, the measurement execution subsystem 102, and the measurement analysis subsystem 103 may be implemented in the form of software. Before using the measurement system 100, software codes respectively corresponding to the scheduling subsystem 101, the measurement execution subsystem 102, and the measurement analysis subsystem 103 may be deployed. In the present embodiment, deployment locations of the scheduling subsystem 101, the measurement execution subsystem 102, and the measurement analysis subsystem 103 are not limited, and these subsystems may be deployed at appropriate network locations according to application requirements.

In a case where the measurement system is applied to a cloud network, as shown in FIG. 1A, the scheduling subsystem 101 is, on one hand, used to perceive the measurement intent of a target tenant in the cloud network and generate a measurement rule that complies with the measurement intent; on the other hand, used to deliver the measurement rule to an appropriate measurement execution subsystem 102 by scheduling the measurement execution subsystem 102, so that the measurement execution subsystem 102 performs operations related to network quality measurement according to the measurement rule and generates measurement record information. Furthermore, the measurement analysis subsystem 103 performs network quality analysis based on the measurement record information, and generates a network quality analysis result. Further, optionally, as shown in FIG. 1A, the network quality analysis result may also be fed back to the scheduling subsystem 101, further affecting the process of the measurement execution subsystem 102 perceiving on the measurement intent of the target tenant. The scheduling subsystem 101 is responsible for perceiving the measurement intent of the target tenant and generating the measurement rule that complies with the measurement intent, which can release the target tenant from network quality measurement. The target tenant does not need to maintain and manage the measurement rule, which helps improve the usage experience of the target tenant when using the cloud network.

The target tenant refers to a tenant in the cloud network, and the number of which may be one or more. The target tenant may refer to all tenants in the cloud network or part of tenants in the cloud network, which may be specifically determined based on network quality measurement requirements. For example, if it needs to understand the network quality of the entire cloud network from the perspective of a cloud network provider, all tenants in the cloud network may be used as target tenants, the measurement intent of each tenant are perceived, and network quality measurement is performed for each tenant, so as to obtain the network quality of the entire cloud network. For another example, if it needs to understand the network quality of the networks of some tenants (these tenants may be tenants who propose network quality measurement requests, or VIP tenants, or tenants whose network quality is lower than the set standard, etc.) from the perspective of the tenants, these tenants may be used as target users, the measurement intents of these tenants are perceived, and network quality measurement is performed for these tenants, so as to meet the network quality measurement requirements of these tenants. For another example, if it needs to understand the network quality of a certain region covered by the cloud network from a regional perspective, tenants in this region may be used as target tenants, the measurement intents of these tenants are perceived, and network quality measurement is performed for these tenants, so as to obtain the network quality of this region. For another example, if it needs to understand the network quality involved for a certain type of applications from the perspective of application category, tenants who deploy such applications may be used as the target tenants, the measurement intents of these tenants are perceived, and network quality measurement is performed for these tenants, so as to obtain the network quality corresponding to this type of applications.

In the present embodiment, the scheduling subsystem 101 perceives the measurement intent of the target tenant. The measurement intent of the target tenant is an intentionalization of the measurement request of the target tenant and can reflect what kind of measurement request that the target tenant needs. The measurement intent may be expressed or described in a language that better fits to the user. It may be understood that the measurement intent is an expression of the measurement request of the target tenant in a way that is close to the user's language expression or description manner. The measurement request here refers to a request to measure the network quality of the cloud network.

In the present embodiment, the scheduling subsystem 101 may use various methods to perceive the measurement intent of the target tenant, no limitation is made thereto. In an optional embodiment, the scheduling subsystem 101 may monitor whether the network topology of the target tenant changes. In a case where the network topology of the target tenant does not change, the measurement intent of the target tenant generally does not change. In a case where the network topology of the target tenant changes, for example, the target tenant purchases a new virtual machine, deletes an existing virtual machine, or changes the configuration information of a virtual machine, etc., the measurement intent for the network quality usually changes. Based on this, the scheduling subsystem 101 may perceive the measurement intent of the target tenant according to the network topology change information of the target tenant. Specifically, the scheduling subsystem 101 may obtain application requirement change information submitted by the target tenant, generate the network topology change information of the target tenant according to the application requirement change information submitted by the target tenant, and determine the measurement intent of the target tenant according to the network topology change information of the target tenant. Changes in the application requirement of the target tenant will directly affect the network topology of the target tenant. For example, because the number of downstream users increases and the target tenant needs to add a virtual machine, the network topology of the target tenant will change due to the addition of a new virtual machine. This virtual machine may need to interconnect with a load balancer, or this virtual machine may need to connect to a dedicated line, or this virtual machine may need to interconnect with other existing virtual machines, which will cause changes in the target tenant's measurement intent to measure network quality. In the present embodiment, no limitation is made to the implementation of the scheduling subsystem 101 obtaining the application requirement change information submitted by the target tenant. The following are examples for illustration.

In an optional embodiment A1, the scheduling subsystem 101 may be implemented as a portal for the target tenant to interact with the cloud network provider. The application requirement information initially submitted or the application requirement change information subsequently submitted by the target tenant may be submitted through the scheduling subsystem 101, so that the cloud network provider can provide corresponding cloud computing services to the target tenant. Based on this, the scheduling subsystem 101 may directly receive the application requirement change information submitted by the target tenant. In the present embodiment, the scheduling subsystem 101 may provide a web page, an application page or a command window to the target tenant. The target tenant opens the web page, application page or command window provided by the scheduling subsystem 101 on a terminal device he/she uses, and submits the application requirement change information to the scheduling subsystem 101 through the web page, application page or command window.

In another optional embodiment A2, the virtual network of the cloud network also includes a network controller, which is a portal for interaction between the tenant and the cloud network provider. In terms of implementation, the network controller may be some software in distributed deployment, which for example, may be an API. Based on the network controller, the target tenant may submit the application requirement information or application requirement change information to the cloud network provider. In the present embodiment, the network controller may provide a web page, an application page or a command window to the target tenant. The target tenant opens the web page, application page or command window provided by the network controller on a terminal device he/she uses, and submits the application requirement change information to the network controller through the web page, application page or command window. Based on this, the scheduling subsystem 101 is in communication connection with the network controller in the cloud network, and obtains the application requirement change information submitted by the target tenant from the network controller.

Further, optionally, in the embodiment A2, the scheduling subsystem 101 may bypass the network controller, and divert the application requirement change information submitted by the target tenant from the network controller to the scheduling subsystem 101 through bypass collection manner. Alternatively, in the embodiment A2, the network controller may provide a subscription service to the scheduling subsystem 101, and the scheduling subsystem 101 may be registered as a subscriber of the network controller to subscribe to the application requirement change information submitted by the tenant, from the network controller. In this way, when the network controller receives application requirement change information submitted by any tenant, it may actively provide the application requirement change information submitted by the tenant to the scheduling subsystem 101.

No matter which method provided by the above embodiments is adopted, after obtaining the application requirement change information submitted by a target tenant, the scheduling subsystem 101 may generate network topology change information of the target tenant according to the application requirement change information, in combination with the maintained network topology of the cloud network, and then determine the measurement intent of the target tenant according to the network topology change information. For example, when the target tenant adds a virtual machine, the scheduling subsystem 101 may add a new virtual machine and network connection related to the new virtual machine on the basis of the original network topology of the target tenant, to obtain the network topology change information of the target tenant. Furthermore, when it perceives that the target tenant may need to measure the network quality between the existing virtual machine and the new virtual machine, the measurement intent may be expressed as: measuring the network quality between the existing virtual machine Vm1 and the new virtual machine Vm2. For another example, in a case where the target tenant newly configures a public network IP address for an existing virtual machine according to application requirements, the scheduling subsystem 101 may add a network connection between the existing virtual machine and the public network on the basis of the original network topology of the target tenant, to obtain the network topology change information of the target tenant. Furthermore, when it perceives that the virtual machine of the target tenant needs to access a public network corresponding to this public network IP, it is necessary to detect the network quality from the virtual machine to the public network. Assume that the public network is the public network-12345, the measurement intent may be expressed as: measuring the network quality to the public network-12345 (measure network-12345).

After perceiving the measurement intent of the target tenant, the scheduling subsystem 101 may generate a measurement rule that complies with the measurement intent. This process refers to a process of analyzing the measurement intent to obtain relevant information required for network quality measurement, and organizing the relevant information according to an information format that can be identified by the measurement execution subsystem 102, to finally obtain the measurement rule. The measurement rule includes relevant information required to measure the network quality of the cloud network according to network quality measurement requirements. This information at least includes information that can indicate the network quality of a path between which end devices needs to be measured. For example, it may include but is not limited to: identification information of a source end device and a destination end device. The source end device and the destination end device may uniquely determine a network path. In the embodiments of the present application, the network path defined by the source end device and the destination end device is called a path to be measured. The identification information here may be any information that can uniquely identify the source end device or the destination end device, such as an IP address, MAC address, or device serial number. There may be one or more groups of the source end device and the destination end device, which depends on the network quality measurement requirements. Further, optionally, the measurement rule may further include a communication protocol used for network communication between the source end device and the destination end device, such as UDP protocol, TCP protocol, to facilitate the network quality measurement for the path between the source end device and the destination end device by using the communication protocol supported by these two devices. Taking the measurement intent being to measure the network quality between an existing virtual machine Vm1 and a new virtual machine Vm2 as an example, the measurement rule generated based on the measurement intent may be expressed as: source end device (Src): Vm1, destination end device (Dst): Vm2, communication protocol (protocol): UDP.

In the embodiments of the present application, no limitation is made to the implementation of generating the measurement rule by the scheduling subsystem 101. In an optional embodiment, the scheduling subsystem 101 may determine a source end device and a destination end device on a path to be measured according to the measurement intent of the target tenant, in combination with network configuration information of the target tenant; and then generate the measurement rule according to the source end device and the destination end device on the path to be measured. The network configuration information of the target tenant refers to various information configured by the target tenant through a tenant network layer, including but is not limited to: routing table entry information, access control list (ACL) information, network element device information, network topology information, etc. Furthermore, when determining the source end device and the destination end device, a source end device to be measured may be analyzed from the measurement intent of the target tenant, which, for example, may be a virtual machine newly added by the target tenant, or a public network or dedicated line that needs to be accessed. etc. After that, network topology where the source end device is located is determined from the topology of the entire cloud network, and a potential path that has an access relationship with the source end device is obtained according to the network topology where the source end device is located, in combination with the network configuration information of the target tenant, wherein the potential path may be one or more; an end device at one end of the potential path is the source end device, and a destination end device corresponding to the source end device is determined from another end device on the potential path. In the present embodiment, no limitation is made to the implementation of determining the destination end device corresponding to the source end device from the other device on the potential path. The following are examples for illustration.

In an optional embodiment B1, the other end device on all potential paths may be used as the destination end device corresponding to the source end device by default, which means that all potential paths will be regarded as paths to be measured, and at least the network quality of all potential paths may be learned by measurement.

In another optional embodiment B2, the maximum number of paths allowed for each measurement may be set, denoted as N. N is a fixed value, for example, it may be an integer value such as 1, 2, 3 or 4. Then, in a case where there are a plurality of potential paths, at least one potential path with a number no greater than N may be randomly selected, and the other end device on the selected at least one potential path is used as the destination end device corresponding to the source end device. Correspondingly, the selected at least one potential path will be regarded as a path to be measured, and the network quality of the selected at least one potential path may be learned by measurement.

In yet another optional embodiment B3, the target tenant is allowed to select a measurement method used. The measurement method that can be selected by the user includes but is not limited to: full coverage measurement method and selective measurement method. The full coverage measurement method refers to a method of measuring all existing potential paths, and the selective measurement method refers to a method of selectively measuring part of potential paths. In this optional embodiment, the target user may choose a measurement method used. If the target tenant chooses the full coverage measurement method, the other end device on all potential paths may be used as the destination end device corresponding to the source end device, that is, all potential paths will be regarded as paths to be measured, and the network quality of all potential paths may be learned by measurement. If the target tenant chooses the selective measurement method, part of potential paths may be selected from all potential paths, and the other end device on the selected part of potential paths is used as the destination end device corresponding to the source end device, that is, the selected part of potential paths will be regarded as the path to be measured, and at least the network quality of the selected part of potential paths may be learned by measurement.

Regarding how to select part of potential paths from all potential paths, in the embodiments of the present application, no limitation is made thereto. For example, a part of potential paths may be randomly selected, or a part of potential paths may be selected according to the maximum path number N allowed for each measurement. Alternatively, the target tenant may also be allowed to set a selection condition, such as the type of the other end device, regional location, network access time, etc., and a part of potential paths may be selected according to the selection condition set by the target tenant.

Further, optionally, in the embodiment B3, the scheduling subsystem 101 may present a human-computer interaction interface to the target tenant, and a measurement method option is provided on the human-computer interaction interface. The option at least includes a full coverage measurement method and a selective measurement method for the target tenant to select. In response to the selection operation initiated by the target tenant on the measurement method option, the measurement method selected by the target tenant is determined, wherein the measurement method selected by the target tenant is either the full coverage measurement method, or the selective measurement method. In addition to this implementation, the scheduling subsystem 101 may also obtain the measurement method selected by the target tenant through the network controller in the cloud network. Specifically, the network controller may present a human-computer interaction interface to the target tenant, and a measurement method option is provided on the human-computer interaction interface. The option at least includes a full coverage measurement method and a selective measurement method for the target tenant to select. In response to the selection operation initiated by the target tenant on the measurement method option, the measurement method selected by the target tenant is determined and provided to the scheduling subsystem 101. In the present embodiment, no limitation is made to the implementation form of the human-computer interaction interface, which may be, for example, a web page, an application page, or a command window, etc.

After obtaining the measurement rule that complies with the measurement intent, the scheduling subsystem 101 may deliver the measurement rule to the measurement execution subsystem 102, and the measurement execution subsystem 102 performs operations related to the network quality measurement according to the measurement rule. In the present embodiment, there may be one or a plurality of measurement execution subsystems 102. No matter whether there is one or a plurality of measurement execution subsystems 102, in the present embodiment, no limitation is made to the deployment location of the measurement execution subsystem 102. The measurement execution subsystem 102 may be deployed at any location on a path except the location where the end device is located. That is, in the present embodiment, the measurement execution subsystem 102 is not deployed in the tenant's end device, which can reduce the intrusion into the tenant's network environment caused by network quality measurement, so that the tenant does not need to manage and maintain the complex measurement rule.

In a case where there is one measurement execution subsystem 102, no matter which path or paths are to be measured, the scheduling subsystem 101 will directly deliver the measurement rule to this measurement execution subsystem 102, and the measurement execution subsystem 102 performs operations related to the network quality measurement for all the paths to be measured. In a case where there are a plurality of measurement execution subsystems 102, the scheduling subsystem 101 in the present embodiment may also be responsible for scheduling the measurement execution subsystems 102, to use a measurement execution subsystem 102 adapted to a path to be measured to measure the network quality of this path to be measured. Further, in the case where there are a plurality of measurement execution subsystems 102, the plurality of measurement execution subsystems 102 may be deployed in a distributed deployment manner, that is, the plurality of measurement execution subsystems 102 will be deployed at different locations. In addition, physical resources occupied by different measurement execution subsystem 102 may also vary. In view of this, when scheduling the measurement execution subsystems 102, the scheduling subsystem 101 may preferentially select a measurement execution subsystem that is closer to the path to be measured, and/or select a measurement execution subsystem 102 with better execution performance, and/or select a measurement execution subsystem 102 with a smaller load, etc., to which no limitation is made.

Figure 1B:
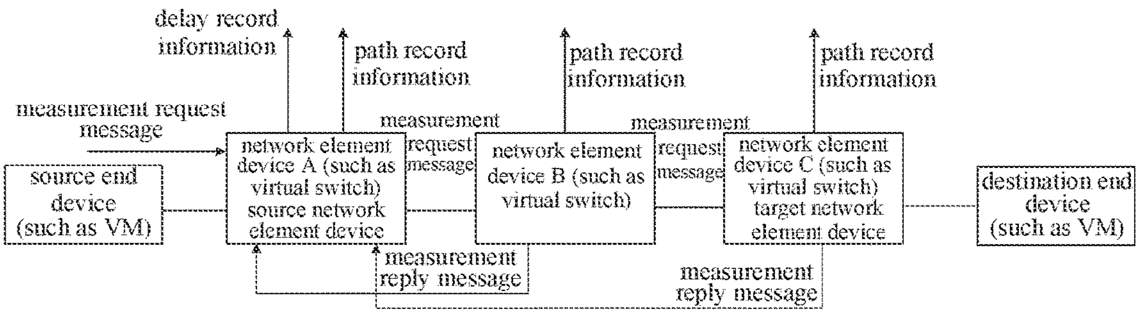
FIG. 1B is a schematic diagram of a process of transmitting a measurement request message into a path to be measured to generate measurement record information, provided by an exemplary embodiment of the present application.

Specifically, the scheduling subsystem 101 may deliver the above measurement rule to a target measurement execution subsystem. The target measurement execution subsystem is a scheduled measurement execution subsystem in at least one measurement execution subsystem 102. The target measurement execution subsystem is a measurement execution subsystem adapted to or corresponding to the path to be measured, which, for example, may be the one closest to the path to be measured, or the one deployed on the path to be measured, or the one with better execution performance. The target measurement execution subsystem is specifically configured for: when being scheduled, generating a measurement request message in the name of the source end device according to the measurement rule delivered by the scheduling subsystem 101, and delivering the measurement request message into the path to be measured, to enable at least part of network element devices on the path to be measured to forward the measurement request message and generate measurement record information. As shown in FIG. 1B, the target measurement execution subsystem delivering the measurement request message into the path to be measured specifically refers to delivering the measurement request message into a certain network element device on the path to be measured, so that the measurement request message may be forwarded continuously from this network element device toward the destination end device. In the present embodiment, the network element device in which the measurement request message is delivered on the path to be measured is called a source network element device. The source network element device may be any network element device on the path to be measured, which may be determined according to the measurement requirements.

The measurement request message refers to a message sent to the destination end device in the name of the source end device. It should be noted that the measurement request message is not generated by the source end device, nor is it sent from the source end device, but is generated and delivered into the path to be measured by the target measurement execution subsystem instead of the source end device, as shown in FIG. 1B. In the present embodiment, no limitation is made to the message format of the measurement request message. Any message format that can reflect "sent to the destination end device in the name of the source end device" is applicable to the embodiments of the present application. The following is a standardized format of the measurement request message provided by an embodiment of the present application, which can support various communication protocols, such as TCP or UDP protocols. As described below, the measurement request message at least includes: a protocol header and a measurement header, wherein the protocol header may be an IP header or a UDP header, etc., to support different communication protocols. The field information included in each header is as follows:

Ip Header:
- dscp: a combination of IP priority and type of service field, its value may be but is not limited to: 63;
- sip: IP address of a source end device;
- dip: IP address of a destination end device;

Udp Header:
- dport: destination port, for example, it may be, but is not limited to, 5000;

Measurement Header:
- uuid: unique ID of a measurement request message;
- tenant-id: ID of a tenant to which the source end device belongs, this ID may represent the virtual network topology of a tenant;
- sip: IP address of a source end device;
- dip: IP address of a destination end device;
- mea_src_tenant_id: ID of a network space to which the source network element device belongs; a tenant may have a plurality of network spaces, and different network spaces may be distinguished by the IDs of the network spaces;
- mea_src_ip: IP address of a source network element device and/or IP address of a physical machine carrying a source network element device;
- timestamp: timestamp when the measurement request message is sent by the source network element device, which is called a first timestamp for distinction;
- mea_reply_tenant_id: used to carry, in a measurement reply message, the ID of a tenant to which a network element device that returns a measurement reply message belongs, which is reserved for use in the measurement request message, and the default is 0;
- mea reply_ip: used to carry, in a measurement reply message, the IP address of a network element device that returns a measurement reply message, which is reserved for use in the measurement request message;
- reply-timestamp: used to carry, in a measurement reply message, the timestamp of returning a measurement reply message, which is reserved for use in the measurement request message.

Based on the above message format, when generating a measurement request message, the target measurement execution subsystem may generate a protocol header according to the information of the source end device and the destination end device. If the protocol header is the IP header, the IP header is generated according to the IP address of the source end device and the destination end device; if the protocol header is the UDP header, the UDP header is generated according to information such as the port number and protocol type of the source end device and the destination end device. Furthermore, the measurement header of the measurement request message is generated according to the ID of the target tenant (corresponding to the tenant-id field), detailed information of the source network element device and the first timestamp of sending the measurement request message (corresponding to the timestamp field); and the measurement request message is generated according to the protocol header and the measurement header. The detailed information of the source network element device includes but is not limited to: the ID of the network space to which the source network element device belongs (corresponding to the mea_src_tenant_id field), the IP address of the source network element device and/or the IP address of the physical machine carrying the source network element device (corresponding to the mea src_ip field). For the target measurement execution subsystem, if it is not deployed in the source network element device, the time point at which it delivers the measurement request message into the source network element device may be used as the first timestamp; if it is deployed in the source network element device, the time point at which the source network element device sends the measurement request message may be known and used as the first timestamp.

It should be noted that the above source network element device refers to a network element device into which the measurement request message is delivered on the path to be measured. Optionally, according to the deployment relationship between the target measurement execution subsystem and the source network element device, the manner in which the target measurement execution subsystem delivers the measurement request message into the source network element device will be different. For example, in an optional embodiment, a measurement execution subsystem may bypass each network element device in the cloud network. Based on this, after generating a measurement request message, the target measurement execution subsystem may send the measurement request message to its corresponding network element device. For another example, in another optional embodiment, a measurement execution subsystem may be directly deployed in each network element device in the cloud network. Based on this, the process of the target measurement execution subsystem delivering the measurement request message into the source network element device is actually a process in which the target measurement execution subsystem deployed in the source network element device generates the measurement request message. In this case, the generation time of the measurement request message is basically the same as or consistent with the sending time of the measurement request message.

In the present embodiment, no matter which deployment manner the measurement execution subsystem adopts, no specific limitation is made to the source network element device. The source network element device may be any network element device on the path to be measured. In the present embodiment, in addition to the source end device and the destination end device, the path to be measured also includes at least one network element device connected between the source end device and the destination end device. The target measurement execution subsystem may send the measurement request message to any network element device (i.e., the source network element device) on the path to be measured. The source network element device forwards the measurement request message, so that the measurement request message is forwarded continuously by other network element devices on the path to be measured. It should be noted that the specific network element device to which the measurement request message is delivered and to which the measurement request message is forwarded may be determined according to the network quality measurement requirements. Corresponding to the source network element device, the network element device to which the measurement request message is finally forwarded is called a target network element device.

In an optional embodiment, if the network quality of a local path needs to be measured, the measurement request message may be delivered into a start network element device of the local path, and the start network element device forwards the measurement request message. The measurement request message is forwarded continuously by subsequent network element devices until to the end network element device of the local path. In this optional embodiment, the source network element device above is the start network element device, and correspondingly, the target network element device is the end network element device. The local path refers to a section of the path to be measured. The target measurement execution subsystem may limit the number of forwarding times of the measurement request message, and determine, based on the number of forwarding times, that the measurement request message will not be forwarded after it reaches the end network element device. Alternatively, the target measurement execution subsystem may also send a termination instruction to the end network element device, to instruct the end network element device not to continue forwarding the measurement request message.

Alternatively, in another optional embodiment, the target measurement execution subsystem may send the measurement request message to a first network element device on the path to be measured which is directly connected to the source end device, and the first network element device forwards the measurement request message, so that the measurement request message is forwarded continuously on the path to be measured until to a second network element device, wherein the second network element device is a network element device on the path to be measured which is directly connected to the destination end device. FIG. 1B illustrates an example in which the measurement request message is injected into the first network element device and is gradually forwarded to the second network element device. In this optional embodiment, the source network element device above is the first network element device, and correspondingly, the target network element device is the second network element device. In this embodiment, each intermediate network element device on the path to be measured forwards the measurement request message and may generate corresponding measurement record information. Not only the network quality of the entire path can be measured, the network quality of each intermediate network element device can also be measured, which provides the ability to locate network problems quickly and accurately.

Further, optionally, in the above embodiments, after receiving the measurement request message, the second network element device no longer forwards the measurement request message, but drops the measurement request message after generating measurement record information. This can reduce the intrusion of the measurement request message to the destination end device and ensure that the tenant is unaware of the network measurement. FIG. 1B illustrates an example in which the second network element device drops the measurement request message and no longer forwards it to the destination end device. In addition, if it needs to measure the network quality between the second network element device and the destination end device, or it needs to measure the network quality of the destination end device, the second network element device may also forward the measurement request message to the destination end device, and the destination end device generates measurement record information using the same method used by the previous-mentioned network element devices. Furthermore, in order to improve the tenant's experience, whether the destination end device needs to perform network quality measurement may be determined by the tenant to which the destination end device belongs. The tenant may choose to enable a network quality measurement function of the destination end device, and the second network element device may continue to forward the measurement request message to the destination end device. If the tenant does not enable the network quality measurement function of the destination end device, the second network element device will directly drop the measurement request message and will not forward it further.

In the present embodiment, after the source network element device forwards the measurement request message, other network element devices on the path to be measured that receive the measurement request message may return a measurement reply message to the source network element device. In the present embodiment, no limitation is made to the message format of the measurement reply message. Similar to the measurement request message, an embodiment of the present application provides a standardized format of the measurement reply message. As described below, the measurement reply message at least includes: a protocol header and a measurement header, wherein the protocol header may be an IP header or a UDP header, etc., to support different communication protocols. The field information included in each header is as follows:

Ip Header:

- dscp: a combination of IP priority and type of service field, its value may be but is not limited to: 62;
- sip: IP address of a destination end device;
- dip: IP address of a source end device;

Udp Header:

- dport: destination port, the same as the measurement request message, its value may directly copy the value of the UDP header of a measurement request message;

Measurement Header:

The measurement header and field information contained in the measurement reply message are the same as the field information contained in the measurement header of the measurement request message. It may directly copy the field values in the measurement header of the measurement request message. However, certain field values specifically used for the measurement reply message, such as mea_reply_tenant_id, mea_reply_ip, reply-timestamp, are supplemented. Based on this, it can be seen that the field information contained in the measurement header of the measurement reply message is as follows:

- uuid: unique ID of the measurement reply message, which may be the same as or corresponding to the value in a measurement request message;
- tenant-id: ID of a tenant to which a source end device belongs;
- sip: IP address of a source end device;
- dip: IP address of a destination end device;
- mea_src_tenant_id: ID of a network space to which a source network element device belongs;

mea src_ip: IP address of a source network element device and/or IP address of a physical machine carrying a source network element device;

timestamp: timestamp when the measurement request message is sent, which is called a first timestamp;

mea_reply_tenant_id: ID of a tenant to which a network element device that returns a measurement reply message belongs;

mea reply_ip: IP address of a network element device that returns a measurement reply message;

reply-timestamp: timestamp of returning a measurement reply message.

Based on the above format of the measurement reply message, for a network element device that needs to return the measurement reply message, the protocol header in the measurement reply message may be generated according to the information of the source end device and the destination end device; the measurement header in the measurement reply message is generated according to information such as the ID of the tenant to which the network element itself belongs, detailed information of the network element itself, and the first timestamp; and the measurement reply message is generated according to the protocol header and the measurement header. It should be noted that when the network element device generates a measurement reply message, some information may be directly copied from the measurement request message; alternatively, relevant information may be directly modified on the basis of the measurement request message to obtain the measurement reply message. For the source network element device, in addition to forwarding the measurement request message, it may also receive measurement reply messages returned by other network element devices.

In the present embodiment, the function of the measurement request message is to make the network element device or end device that the measurement request message passes through generate measurement record information. The measurement record information is some information related to network quality measurement recorded by the network element device or end device that the measurement request message passes through. For example, it may be information such as tenant information, network element device information, and sending and receiving time of the measurement request message. The tenant information may be used to analyze which tenants are involved in the path to be measured and whether it crosses tenants. The network element device information may be used to analyze which network element devices that the measurement request message actually passes through. Further, combined with network element devices that the measurement request message should pass through, it may analyze the packet loss situation of the path to be measured, the tenant network, or the entire cloud network. The sending and receiving time of the measurement request message may be used to analyze the network delay within the network element device, the network delay of the tenant network or the entire path, and may further be used to analyze the network delay of the tenant network or the entire cloud network, etc.

In an optional embodiment of the present application, the measurement record information is divided into two types. One is path record information, which is mainly used to record information of a path that the measurement request message passes through; the other is delay record information, which is mainly used to record transmission delay of the measurement request message during the forwarding process. Each network element device that sends the measurement request message may generate the path record information. The source network element device, that is, the above start network element device or the first network element device, may be responsible for generating the delay record information. The delay record information of the measurement request message may be generated according to information related to the measurement request message and the measurement reply message. In the embodiments of the present application, no limitation is made to the information format of the path record information and the delay record information. The present embodiment provides an exemplary format of the path record information and the delay record information as follows:

Path Record Information:

Tenant-id: ID of a tenant to which a network element device that generates a path record information belongs; this tenant ID may be different from the tenant ID in a measurement request message;

GEN-IP: IP address of a network element device that generates path record information and/or IP address of a physical machine that carries network element device; wherein the IP address of the network element device and the IP address of the physical machine may be the same, or may be different;

GEN-POINT: reserved field, which is not defined;

GEN-TS: timestamp recording the generation of the path record information, which is called a second timestamp or a third timestamp for distinction, see below for the explanation of the second timestamp or the third timestamp;

GEN-DROP-CODE: if a packet is dropped, fill in the reason for packet loss, wherein the reason for packet loss may be hardware reasons, speed limit reasons, etc.;

Whether it is a target network element device: it is a Boolean (bool) variable whose value is yes or no;

Next-hop network element device IP: IP address of a next-hop network element device;

Measurement header: the same as the measurement header in a measurement request message, the specific value of which may be directly copied from the value of the measurement header in a measurement request message.

It should be noted that each field included in the above path record information may be flexibly adjusted according to application requirements and may be increased or decreased, no limitation is made to these fields. Based on this, the source network element device (i.e., the first network element device or the start network element device) and other network element devices that receive the measurement request message may record at least one of the following information: ID of a tenant to which a network element itself belongs, detailed information of a network element itself, a second timestamp of receiving the measurement request message, and a third timestamp of forwarding the measurement request message, so as to generate the path record information.

In an optional embodiment, other network element devices that receive the measurement request message may generate one piece of path record information, and the GEN-TS field may include two timestamps, i.e., a second timestamp and a third timestamp. The second timestamp indicates the time point at which the measurement request message is received, and the third timestamp indicates the time point at which the measurement request message is forwarded. Alternatively, in another optional embodiment, other network element devices that receive the measurement request message may generate two pieces of path record information. That is, when the measurement request message is received, one piece of path record information is generated, and the GEN-TS field in this path record information records the second timestamp; when the measurement request message is forwarded, one piece of path record information is generated again, and the GEN-TS field in this path record information records the third timestamp.

Delay Record Information:

- Tenant-id: ID of a tenant to which a network element device (i.e., the source network element device) that generates the delay record information belongs; in a case where the source network element device generates delay record information, this tenant ID is the same as the tenant ID in a measurement request message;
- GEN-IP: IP address of a network element device (i.e., the source network element device) that generates delay record information and/or IP address of a physical machine that hosts a network element device, wherein these two IP addresses may be the same, or may be different;
- GEN-POINT: reserved field, which is not defined;
- GEN-TS: timestamp recording the time point at which the measurement request message is sent, i.e., the first timestamp;
- Network element IP: IP address of a network element device that generates the measurement reply message;
- Measurement header: the same as the measurement header in a measurement reply message, the value of which may directly copy the value of the measurement header in a measurement reply message. However, the source network element device will modify the reply-timestamp field in the measurement header after receiving the measurement reply message, and modify it to a timestamp of receiving the measurement reply message, which is called a fourth timestamp for distinction.

Based on the above format of the delay record information, the source network element device may generate delay record information according to a first timestamp of sending a measurement request message and a fourth timestamp of receiving a measurement reply message. The source network element device may read the first timestamp from the measurement reply message and record the first timestamp into the delay record information; in addition, record the timestamp of receiving the measurement reply message as a fourth timestamp, and record the fourth timestamp into the delay record information.

After generating the path record information or the delay record information, the above source network element device and other network element devices may report this information to the measurement analysis subsystem 103. On the basis of the path record information and the delay record information, the measurement analysis subsystem 103 may perform network quality analysis from at least one dimension of path, tenant, and cloud network. Specifically, the measurement analysis subsystem 103 may analyze, according to the collected delay record information and path record information, at least one of the network delays of a path to be measured, the packet loss rate of a path to be measured, the network delay of a target tenant, the packet loss rate of a target tenant, the network delay of an entire cloud network, and the packet loss rate of an entire cloud network.

Figure 1C:
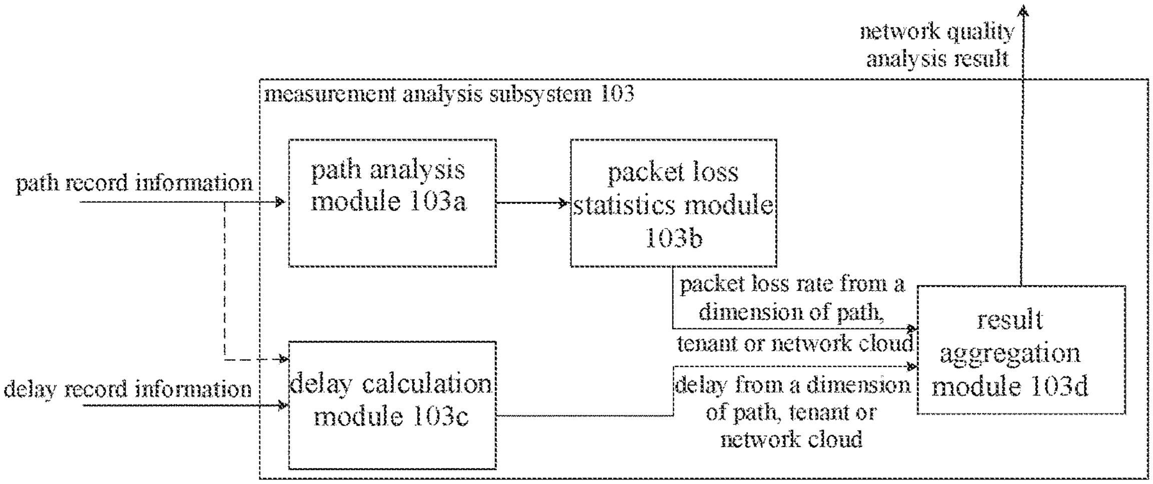
FIG. 1C is a schematic internal structural diagram of a measurement analysis subsystem provided by an exemplary embodiment of the present application.

As shown in FIG. 1C, an internal implementation structure of the measurement analysis subsystem 103 includes: a path analysis module 103*a*, a packet loss statistics module 103*b*, a delay calculation module 103*c*, and a result aggregation module 103*d*.

The path record information generated by the source network element device or other network element devices is sent to the path analysis module 103*a*. The path analysis module 103*a* analyzes to obtain path record information of the same path to be measured according to the message ID in the measurement header of the path record information. That is, path record information containing the same message ID is the path record information of the same path to be measured. The path record information is classified from the path dimension, and pieces of path record information, obtained by classification, of different paths to be measured are provided to the packet loss statistics module 130*b*, respectively. For the path record information of each path to be measured, the packet loss statistics module 103*b* may analyze to obtain, in combination with the tenant ID and the IP of the network element device in the path record information, which network element devices that the measurement request message has passed, and may also analyze, further in combination with the reason for packet loss in the path record information, which network element devices drop packets and what is the reason for packet loss. Further according to these pieces of information, the packet loss statistics module may analyze to obtain the packet loss rates of different paths to be measured from the path dimension; further, in combination with the tenant ID, it may analyze to obtain paths to be measured corresponding to the same tenant. According to the packet loss rates of the paths to be measured corresponding to the same tenant, the packet loss statistics module may analyze to obtain the packet loss rate of the tenant network from the tenant dimension. Furthermore, it may also analyze to obtain, according to the packet loss rates of different tenant networks, the packet loss rate of the entire cloud network from the cloud network dimension. The packet loss statistics module 130*b* provides an obtained packet loss rate in each dimension to the result aggregation module 103*d*.

The delay record information generated by the source network element device is sent to the delay calculation module 103*c*. According to the message ID in the measurement header of the delay record information, the delay calculation module 103*c* may analyze to obtain delay record information of the same path to be measured. Further, according to the first timestamp and second timestamp in the delay record information, the delay calculation module may measure the network delay between the source network element device and different network element devices. Further, from the path dimension, the delay calculation module may analyze to obtain the network delay of the entire path to be measured. Furthermore, from the cloud network dimension, it may also analyze to obtain the network delay of the entire cloud network according to the network delay of different paths to be measured. The delay calculation module 130*c* provides an obtained packet loss rate from each dimension to the result aggregation module 103*d*.

Further, optionally, the path record information may also be sent to the delay calculation module 103*c*. The delay calculation module 103*c* may identify, in combination with information such as the message ID, network element IP in the path record information, pieces of path record information generated by a same network element device when receiving the measurement request message and forwarding the measurement request message. According to a second timestamp and a third timestamp recorded in the two pieces of path record information, the delay calculation module calculates the processing delay within a network element device, and provides the processing delay within the network element device to the result aggregation module 103*d*.

The result aggregation module 103*d* may summarize the packet loss rate from each dimension and the network delay from each dimension, perform network quality analysis according to network quality measurement requirements, and output a network quality analysis result. Optionally, as shown in FIG. 1A, the network quality analysis result may also be output to the scheduling subsystem 101 to influence the intent perception of the scheduling subsystem 101, forming a measurement closed-loop system and improving the network quality measurement effect.

Using the measurement system of the embodiments of the present application, by perceiving the measurement intent of a tenant and performing network quality measurement based on the measurement intent, the tenant can be released from the network quality measurement. Compared with the solution in which the tenant actively measures the network quality, the embodiments of the present application avoid tenant's management of complex measurement rule and simplifies network quality measurement work. By applying a bypass packet injection method, there is no need to deploy measurement services in the tenant's network environment, which helps reduce intrusion into the tenant's network environment. In addition, the bypass packet injection method in the present embodiments is active packet injection, which can avoid the dependence on tenant's actual application traffic, and the network quality can be measured even in a case where the tenant does not generate any actual application traffic. Furthermore, the embodiments of the present application provide the standardized measurement request message, standardized measurement reply message, standardized path record information and standardized delay record information. Based on these standardized messages or information formats, a standardized network quality measurement protocol can be implemented. These standardized messages and information can not only carry information of virtual network elements, but also carry information of physical machines and tenants at the same time, thereby realizing the network quality measurement for a three-layer network of the physical network, overlay network and tenant network, which can support the full coverage of quality measurement for network end-to-end and intermediate nodes, with the ability to quickly locate network problems.

Figure 1D:
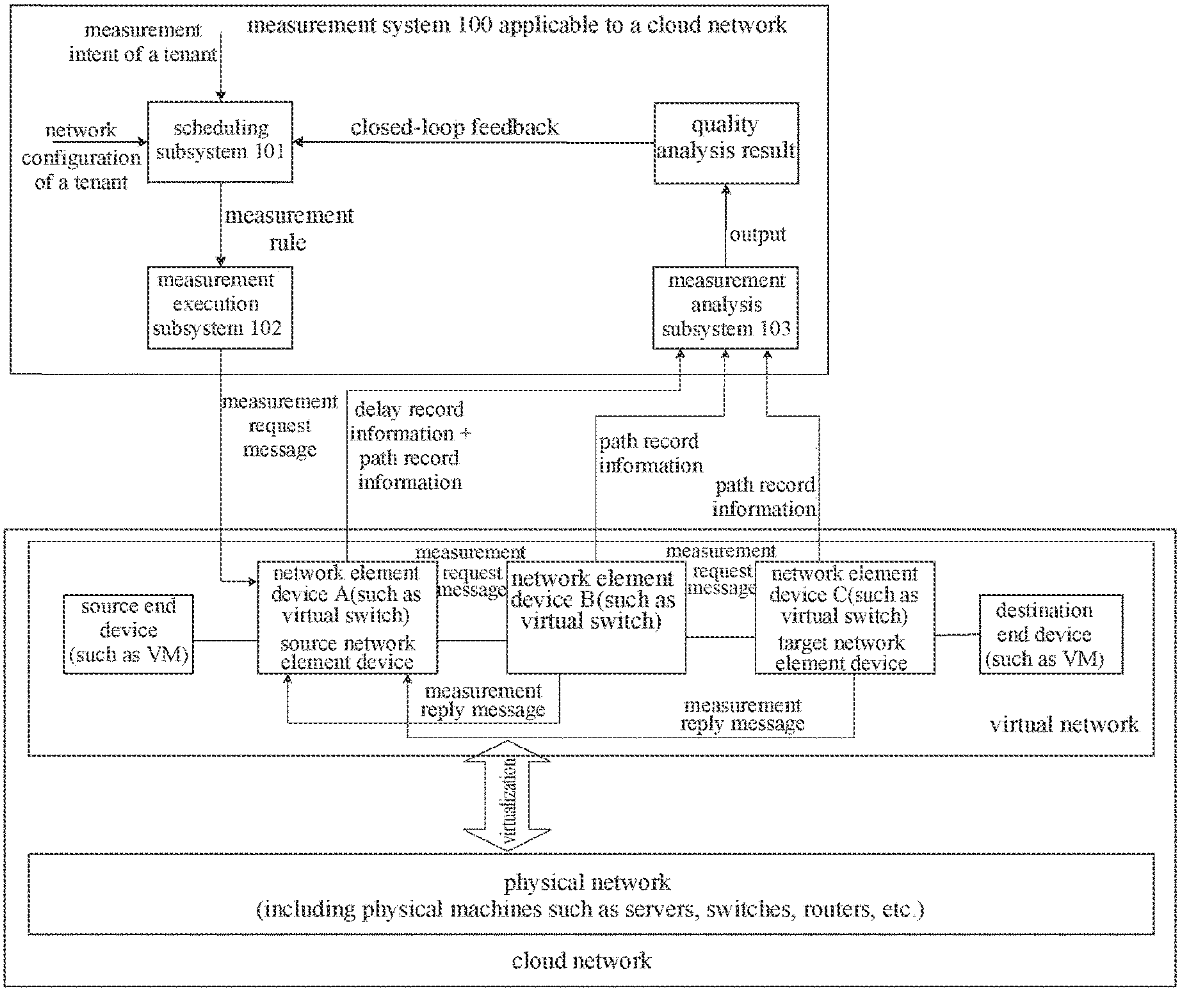
FIG. 1D is a schematic diagram of a usage state of a measurement analysis subsystem when deployed independently of a cloud network, provided by an exemplary embodiment of the present application.
Figure 2A:
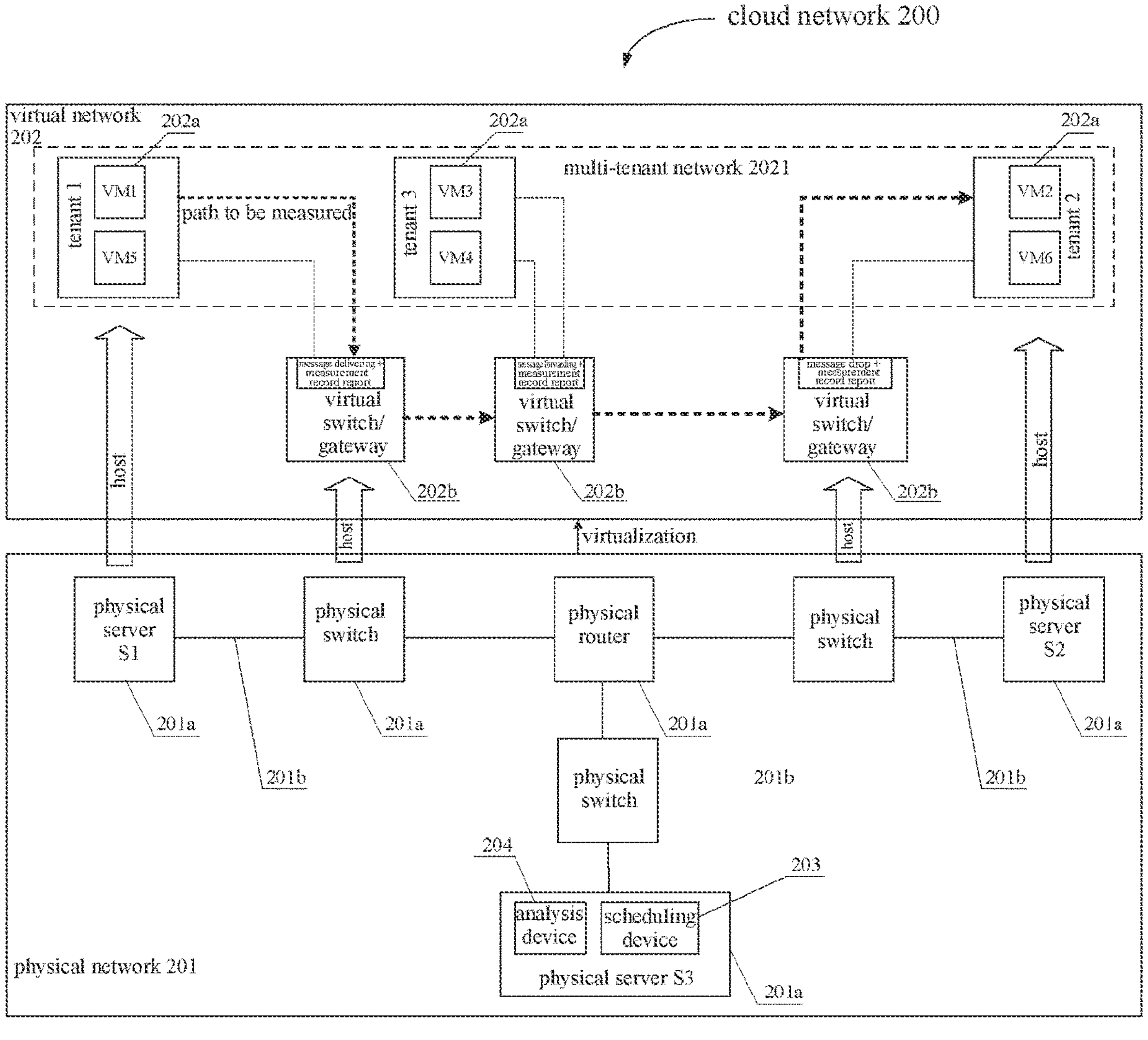
FIG. 2A is a schematic structural diagram of a cloud network provided by an exemplary embodiment of the present application.

In the above embodiments, no limitation is made to the deployment implementation of a measurement system. In an optional embodiment, the measurement system may be independently deployed outside the cloud network and in communication connection with the network element devices in the cloud network, as shown in FIG. 1D. In another optional embodiment, each subsystem in the measurement system may be implemented by distributing and deploying in the cloud network. In view of this, an embodiment of the present application further provides a cloud network with a network quality measurement function. As shown in FIG. 2A, the cloud network 200 includes a physical network 201, and a virtual network 202 deployed over the physical network 201. Further, as shown in FIG. 2A, the virtual network 202 includes a multi-tenant network 2021. In FIG. 2A, it is illustrated, but not limited to, networks of tenant 1, tenant 2 and tenant 3 as an example.

The physical network 201 includes physical machines 201*a* such as servers, cabinets, routers, and switches, as well as physical connection lines 201*b* used to realize network connections between these physical machines, for example, coaxial cables, network cables, optical fibers, etc. In FIG. 2A, the physical machines 201*a* including a physical server S1, a physical server S2, a physical server S3, and physical switches and physical routers connected between these physical servers is taken as an example for illustration. However, those skilled in the art should understand that the network resources and the network architecture included in the entire physical network 201 are not limited thereto.

In the embodiments of the present application, the network resources in the physical network 201 are virtualized using virtualization technology, thereby obtaining the virtual network 202 hosted on the physical network 201. As shown in FIG. 2A, the virtual network 202 includes the multi-tenant network 2021. In FIG. 2A, it is illustrated, but not limited to, networks of tenant 1, tenant 2 and tenant 3 as an example. Further, optionally, it may be implemented, but not limited to, the networks of tenant 1, tenant 2 and tenant 3 as respective VPC. Network environments of different tenants are isolated from each other. Each tenant network includes an end device 202*a* visible to the tenant. These end devices 202*a* are hosted on the physical machines 201*a* in the physical network 201. In FIG. 2A, taking the end device 202*a* being a VM as an example for illustration, these VMs are located on the physical servers S1 and S2 in the physical network 201. Further, as shown in FIG. 2A, the virtual network 202 further includes a network element device 202*b* used for traffic forwarding and network interconnection between different end devices 202*a*. The network element device 202*b* may be a virtual switch or a virtual gateway. In FIG. 2A, it is illustrated, but not limited to, the network element device 202*b* being a virtual switch or a virtual gateway as an example. The network element device 202*b* belongs to the virtual network 202 rather than any tenant network.

Figure 2B:
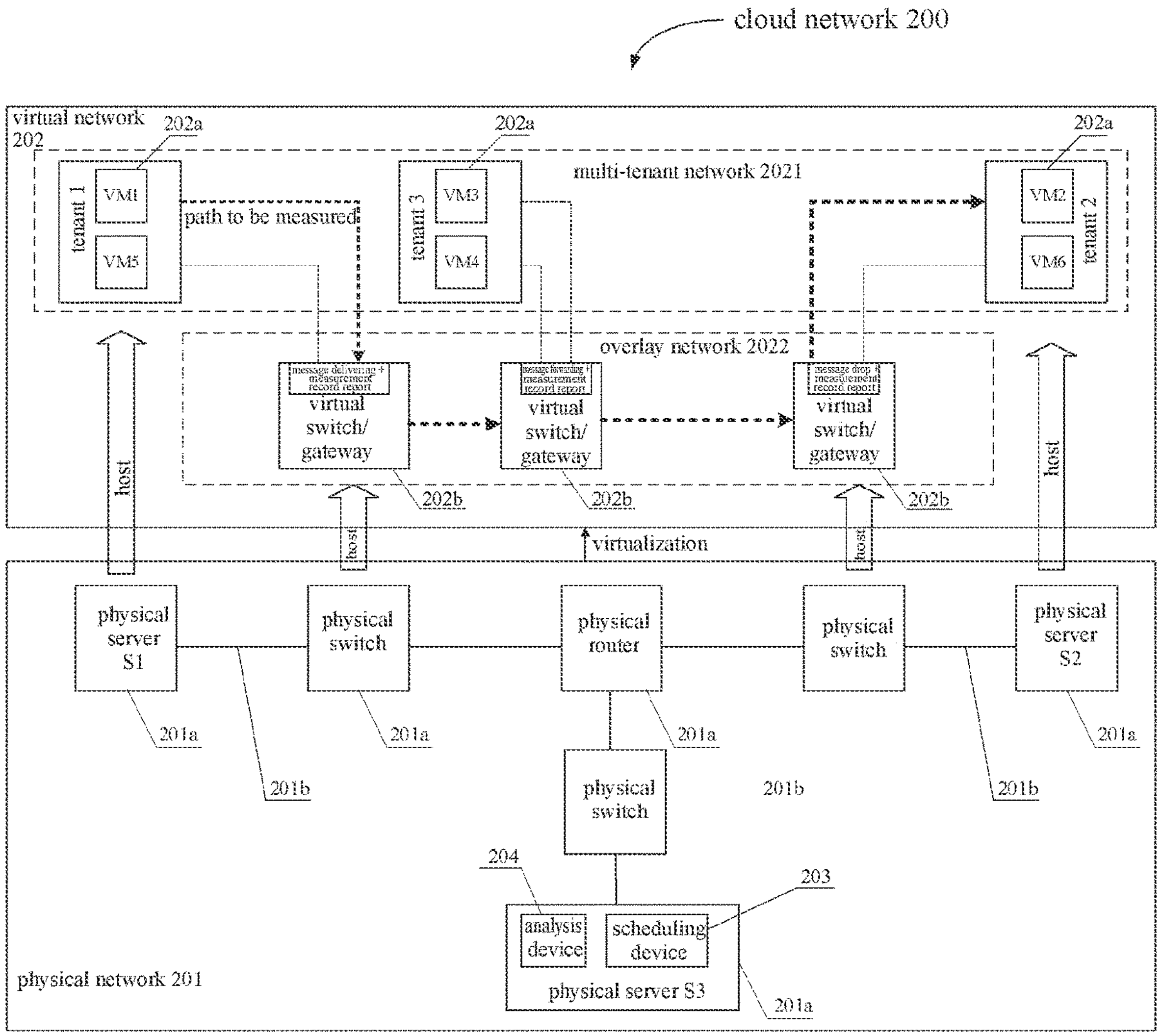
FIG. 2B is a schematic structural diagram of another cloud network provided by an exemplary embodiment of the present application.

In an optional embodiment, as shown in FIG. 2B, overlay technology is used to implement an overlay network 2022 in the virtual network 202. The overlay network 2022 is between the physical network 201 and the multi-tenant network 2021. The above network element device 202*b* may be implemented in the overlay network 2022. The overlay network 2022 is a bridge between the multi-tenant network 2021 and the physical network 201, allowing the interconnection between the end devices 202*a* in the multi-tenant network 2021 to be free of constraints of the physical network, providing conditions for the ultimate realization of flexible definition, on-demand allocation, and on-demand adjustment of network resources. In this way, the entire cloud network 200 may be implemented as a three-layer network architecture including the physical network 201, overlay network 2022, and multi-tenant network 2021, however, to which the division for a cloud network architecture is not limited.

Further, as shown in FIG. 2A or FIG. 2B, the cloud network 200 of the present embodiment further includes a scheduling device 203 and an analysis device 204. In the present embodiment, no limitation is made to the deployment locations of the scheduling device 203 and the analysis device 204 in the cloud network 200. In an optional embodiment, the scheduling device 203 and the analysis device 204 are deployed and implemented in the physical network 201. For example, they are both deployed and implemented on the same physical machine 201*a* in the physical network 201. Alternatively, they are deployed and implemented on different physical machines 201*a* in the physical network 201. One or more physical machines 201*a* may be added to the physical network 201 for deploying the scheduling device 203 and the analysis device 204. Alternatively, the scheduling device 203 and the analysis device 204 may also be directly deployed on an original physical machine 201*a* in the physical network 201. In another optional embodiment, the scheduling device 203 and the analysis device 204 are deployed and implemented in other network locations in the virtual network 202 except the multi-tenant network 2021. For example, they may be deployed and implemented in the overlay network 2022. In FIG. 2A or FIG. 2B, it is illustrated, but not limited to, the scheduling device 203 and the analysis device 204 being both deployed and implemented on the physical server S3 in the physical network 201 as an example. In addition, each network element device 202*b* in the virtual network 202, in addition to having functions such as traffic forwarding, message processing, and network interconnection, may also cooperate with the scheduling device 203 and the analysis device 204 to implement network quality measurement, which mainly refers to processing such as delivering and forwarding of a measurement request message, generation and report of measurement record information. Depending on different locations of network element devices 202*b* on a path to be measured, the processing operations of each network element device 202*b* will be different. In the following, the present embodiment will mainly describe the process in which the network element device 202*b* cooperates with the scheduling device 203 and the analysis device 204 to implement network quality measurement in detail.

In the present embodiment, the scheduling device 203 perceives a measurement intent of a target tenant, generates a measurement rule that complies with the measurement intent, and delivers the measurement rule to a source network element device. The measurement rule includes a source end device and a destination end device on a path to be measured. The source network element device is any network element device 202*b* on the path to be measured. Regarding the detailed implementation of the scheduling device 203 perceiving the measurement intent of the target tenant and generating the measurement rule, please refer to the detailed implementation of the scheduling subsystem 101 perceiving the measurement intent and generating the measurement rule in the foregoing embodiments, to which no description is repeated here.

In the present embodiment, the source network element device is responsible for generating a measurement request message according to the measurement rule and forwarding the measurement request message. The measurement request message is used for enabling the source network element device and other network element devices on the path to be measured that receive the measurement request message to generate measurement record information. The source network element device may be any network element device on the path to be measured, which may be determined according to the measurement requirements. In an optional embodiment, the source network element device is a first network element device on the path to be measured which is directly connected to the source end device. In this case, the measurement request message is forwarded, starting from the first network element device to the target network element device. Similarly, in the embodiments of the present application, there is no limitation made to the target network element device. Optionally, the target network element device is a second network element device on the path to be measured which is directly connected to the destination end device.

In an optional embodiment, the implementation of the source network element device generating a measurement request message includes: generating a protocol header in the measurement request message according to information of the source end device and the destination end device; generating a measurement header in the measurement request message according to an identifier of the target tenant, detailed information of the source network element device, and a first timestamp; generating the measurement request message according to the protocol header and the measurement header, wherein the first timestamp indicates the time point at which the source network element device sends the measurement request message.

In addition to generating and sending the measurement request message, the source network element device or other network element devices further generate measurement record information. Further, optionally, the measurement record information includes path record information. Based on this, generating the measurement record information by the source network element device and other network element devices includes: recording at least one of the following information: an identifier of a tenant to which a network element itself belongs, detailed information of a network element itself, a second timestamp of receiving the measurement request message, and a third timestamp of forwarding the measurement request message, to generate the path record information. The path record information is reported to the analysis device 204 by the source network element device or other network element devices.

Further, after receiving the measurement request message, other network element devices may further generate a measurement reply message and return it to the source network element device. The measurement reply message includes a first timestamp from the measurement request message. Correspondingly, the source network element device is further configured for generating delay record information according to the first timestamp carried in the measurement reply message and a fourth timestamp of receiving the measurement reply message. The delay record information is reported to the analysis device 204 by the source network element device.

Regarding the detailed processes of generating the measurement request message and generating the path record information and delay record information, please refer to the description of the foregoing embodiments, to which no description is repeated here.

In the present embodiment, the analysis device 204 is configured for performing network quality analysis according to the measurement record information generated by the source network element device and other network element devices. Regarding the detailed implementation of the analysis device 204 performing network quality analysis according to the measurement record information, please refer to the detailed implementation of the measurement analysis subsystem 103 performing network quality analysis in the foregoing embodiments, to which no description is repeated here.

In the cloud network of the present embodiment, a scheduling device and an analysis device are added, and functions of network element devices in the virtual network are expanded, so that the cloud network may perceive the measurement intent of a tenant and perform network quality measurement based on the measurement intent. On one hand, the tenant can be released from the network quality measurement, which simplifies network quality measurement work. On the other hand, by applying a bypass packet injection method, there is no need to deploy measurement services in the tenant's network environment, which helps reduce intrusion into the tenant's network environment. In addition, using the bypass packet injection method can avoid the dependence on tenant's actual application traffic, and the network quality can be measured even in a case where the tenant does not generate any actual application traffic. Furthermore, in combination with the standardized message format and the standardized information format provided by the embodiments of the present application, messages and information in the cloud network can simultaneously carry information of virtual network elements, physical machines and tenants, which may realize network quality measurement for a three-layer network of the physical network, overlay network and tenant network, and can support the full coverage of quality measurement for network end-to-end and intermediate nodes, with the ability to quickly locate network problems.

It should be noted here that the cloud network of the present embodiment supports multi-tenants, does not limit the number of tenants, and supports tenants to deploy multiple applications. In addition, the present embodiment does not limit the link length of a cloud network, which can be flexibly deployed and adjusted according to application requirements. Further, the cloud network of the present embodiment has advantages of being easy to deploy and being able to be flexibly and widely deployed according to application requirements.

Figure 3A:
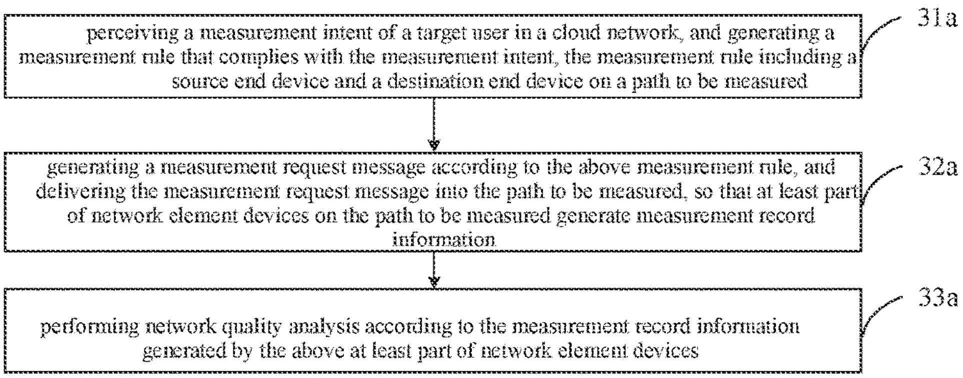
FIG. 3A is a schematic flowchart of a network quality measurement method provided by an exemplary embodiment of the present application.

Furthermore, an embodiment of the present application further provides a network quality measurement method, which is applicable to, but is not limited to, the measurement system or cloud network provided by the above embodiments. As shown in FIG. 3A, the method includes:

step 31*a*: perceiving a measurement intent of a target user in a cloud network, and generating a measurement rule that complies with the measurement intent, the measurement rule including a source end device and a destination end device on a path to be measured;

step 32*a*: generating a measurement request message according to the above measurement rule, and delivering the measurement request message into the path to be measured, so that at least part of network element devices on the path to be measured generate measurement record information;

step 33*a*: performing network quality analysis according to the measurement record information generated by the above at least part of network element devices.

In an optional embodiment, above perceiving the measurement intent of the target user in the cloud network includes: generating network topology change information of the target tenant according to application requirement change information submitted by the target tenant; determining the measurement intent of the target tenant according to the network topology change information.

In an optional embodiment, above generating the measurement rule that complies with the measurement intent includes: determining the source end device and the destination end device on the path to be measured according to the measurement intent of the target tenant and network configuration information of the target tenant; generating the measurement rule according to the source end device and the destination end device on the path to be measured.

In an optional embodiment, the above determining the source end device and the destination end device on the path to be measured according to the measurement intent of the target tenant and the network configuration information of the target tenant includes: analyzing a source end device to be measured from the measurement intent of the target tenant; obtaining a potential path that has an access relationship with the source end device according to a network topology where the source end device is located, in combination with the network configuration information of the target tenant; determining a destination end device corresponding to the source end device from another end device on the potential path.

In an optional embodiment, above determining the destination end device corresponding to the source end device from the other end device on the potential path includes: determining the other end devices on all potential paths as the destination end device corresponding to the source end device, if the target tenant chooses a full coverage measurement method; selecting part of potential paths from all potential paths and determining the other end devices on the part of potential paths as the destination end device corresponding to the source end device, if the target tenant chooses a selective measurement method.

Further, optionally, the method of the present embodiment further includes: presenting a human-computer interaction interface to the target tenant, wherein a measurement method option is provided on the human-computer interaction interface for the target tenant to select; determining, in response to a selection operation initiated by the target tenant on the measurement method option, a measurement method selected by the target tenant, wherein the measurement method selected by the target tenant is a full coverage measurement method or a selective measurement method.

In an optional embodiment, above generating the measurement request message according to the measurement rule includes: generating a protocol header in the measurement request message according to information of the source end device and the destination end device; generating a measurement header in the measurement request message according to an identifier of the target tenant, detailed information of a first network element device, and a first timestamp; generating the measurement request message according to the protocol header and the measurement header, wherein the first timestamp indicates the time point at which the measurement request message is sent.

In an optional embodiment, above delivering the measurement request message into the path to be measured, so that at least part of network element devices on the path to be measured generate the measurement record information, includes: sending the measurement request message to a source network element device on the path to be measured, and forwarding the measurement request message, starting from the source network element device to other network element devices on the path to be measured, so that the source network element device and the other network element devices generate the measurement record information.

According to the deployment relationship between the method execution subject and the source network element device, the manner of delivering the measurement request message into the source network element device will be different. In an optional embodiment, a measurement execution subsystem may bypass each network element device in the cloud network, and the measurement execution subsystem generates a measurement request message and delivers it into a network element device that has a bypass relationship with this measurement execution subsystem. Based on this, delivering the measurement request message into the source network element device specifically refers to a process in which, after a measurement execution subsystem that has a bypass relationship with the source network element device generates a measurement request message, this measurement execution subsystem sends the measurement request message to the source network element device. In another optional embodiment, functions of each network element device in the cloud network may be expanded, so that each network element device has the function of generating a measurement request message according to a measurement rule. Based on this, delivering the measurement request message into the source network element device specifically refers to a process of generating a measurement request message by the source network element device based on the expanded message generation function.

In an optional embodiment, generating the measurement record information by the source network element device and other network element devices includes: recording at least one of the following information: an identifier of a tenant to which a network element itself belongs, detailed information of a network element itself, a second timestamp of receiving the measurement request message, and a third timestamp of forwarding the measurement request message, to generate path record information.

In an optional embodiment, generating the measurement record information by the source network element device further includes: receiving a measurement reply message send by other network element devices, the measurement reply message including the first timestamp; generating delay record information according to the first timestamp in the measurement reply message and a fourth timestamp of receiving the measurement reply message.

In an optional embodiment, above performing network quality analysis according to the measurement record information generated by at least part of network element devices includes: analyzing network delay and packet loss rate from at least one dimension of the path to be measured, the target tenant and the cloud network, according to the above delay record information and path record information.

Figure 3B:
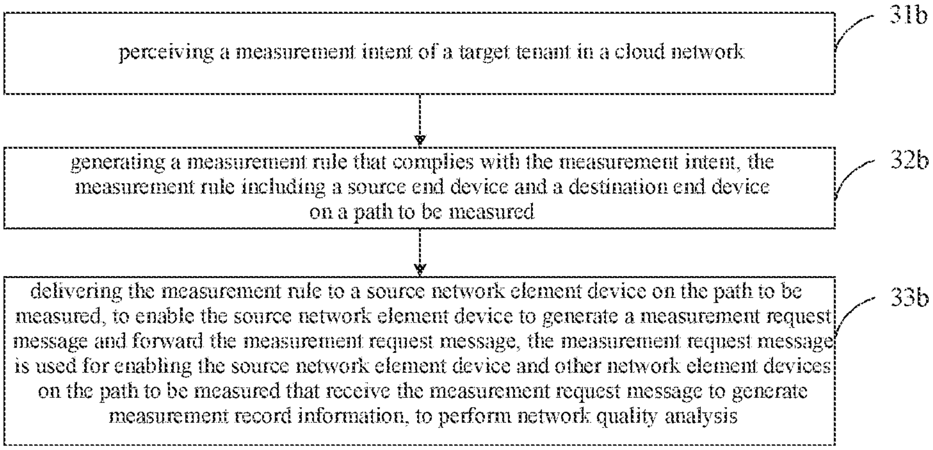
FIG. 3B is a schematic flowchart of a measurement rule generation method provided by an exemplary embodiment of the present application.

In addition to the network quality measurement method as shown in FIG. 3A, an embodiment of the present application also provides a measurement rule generation method. This method is described from the perspective of a scheduling subsystem or a scheduling device. As shown in FIG. 3B, the method includes:

- step 31*b*: perceiving a measurement intent of a target tenant in a cloud network;
- step 32*b*: generating a measurement rule that complies with the measurement intent, the measurement rule including a source end device and a destination end device on a path to be measured;
- step 33*b*: delivering the measurement rule to a source network element device on the path to be measured, so that the source network element device generate a measurement request message and forward the measurement request message; the measurement request message is used for enabling the source network element device and other network element devices on the path to be measured that receive the measurement request message to generate measurement record information to perform network quality analysis.

Optionally, the source network element device may be any network element device on the path to be measured, for example, it may be a first network element device on the path to be measured which is directly connected to the source end device.

Figure 3C:
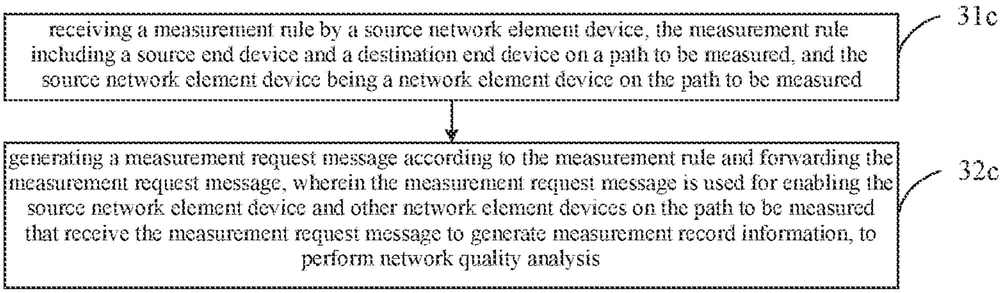
FIG. 3C is a schematic flowchart of a message transfer method provided by an exemplary embodiment of the present application.

Further, an embodiment of the present application also provides a message transmission method. This method is mainly described from the perspective of a network element device in a cloud network. As shown in FIG. 3C, the method includes:

- step 31*c*: receiving a measurement rule by a source network element device, the measurement rule including a source end device and a destination end device on a path to be measured, and the source network element device is a network element device on the path to be measured;
- step 32*c*: generating a measurement request message according to the measurement rule and forwarding the measurement request message, wherein the measurement request message is used for enabling the source network element device and other network element devices on the path to be measured that receive the measurement request message to generate measurement record information, to perform network quality analysis.

In the present embodiment, no limitation is made to the source and generation method of the measurement rule. Alternatively, the measurement rule may be generated using the method in the above embodiment.

Regarding the detailed description and explanation of each step of the above method embodiment, please refer to the foregoing system embodiment, to which no description is repeated here.

It should be noted that the execution subject of each step of the method provided by the above embodiments may be the same device, or different devices may be used as the execution subject of the method. For example, the execution subject of step 31*a* to step 33*a* may be device A. For another example, the execution subject of step 31*a* may be device A, while the execution subject of step 32*a* may be device B, and so on.

In addition, in some processes described in the above embodiments and drawings, multiple operations that occur in a specific order are included, but it should be clearly understood that these operations may be performed out of the order as stated herein or may be performed in parallel. The sequence number of operations, such as 31*a*, 32*a*, is only used to distinguish respective different operations, and the sequence number itself does not represent any execution order. In addition, these processes may include more or fewer operations, and these operations may be performed sequentially or in parallel. It should be noted that descriptions such as "first" and "second" herein are used to distinguish different messages, devices, modules, etc., and do not represent the order, nor do they limit that "first" and "second" are different types.

Figure 4:
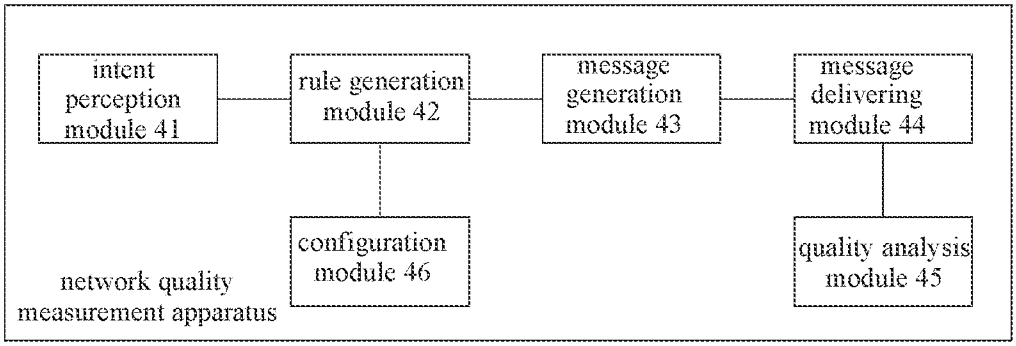
FIG. 4 is a schematic structural diagram of a network quality measurement apparatus provided by an exemplary embodiment of the present application.

FIG. 4 is a schematic structural diagram of a network quality measurement apparatus provided by an exemplary embodiment of the present application. As shown in FIG. 4, the apparatus includes an intent perception module 41, a rule generation module 42, a message generation module 43, a message delivering module 44, and a quality analysis module 45.

The intent perception module 41 is configured for perceiving a measurement intent of a target tenant in a cloud network. The rule generation module 42 is configured for generating a measurement rule that complies with the measurement intent perceived by the intent perception module 41, the measurement rule including a source end device and a destination end device on a path to be measured. The message generation module 43 is configured for generating a measurement request message according to the measurement rule generated by the rule generation module 42. The message delivering module 44 is configured for delivering the measurement request message generated by the message generation module 43 into the path to be measured, so that at least part of network element devices on the path to be measured generate measurement record information. The quality analysis module 45 is configured for performing network quality analysis according to the measurement record information generated by the at least part of network element devices.

In an optional embodiment, the intent perception module 41 is specifically configured for: generating network topology change information of the target tenant according to application requirement change information submitted by the target tenant; determining the measurement intent of the target tenant according to the network topology change information.

In an optional embodiment, the rule generation module 42 is specifically configured for: determining the source end device and the destination end device on the path to be measured according to the measurement intent of the target tenant and network configuration information of the target tenant; generating the measurement rule according to the source end device and the destination end device on the path to be measured.

Further, optionally, when determining the source end device and the destination end device on the path to be measured, the rule generation module 42 is specifically configured for: analyzing a source end device to be measured from the measurement intent of the target tenant; obtaining a potential path that has an access relationship with the source end device according to a network topology where the source end device is located, in combination with the network configuration information of the target tenant; determining a destination end device corresponding to the source end device from another end device on the potential path.

Furthermore, when determining the destination end device corresponding to the source end device, the rule generation module 42 is specifically configured for: determining the other end devices on all potential paths as the destination end device corresponding to the source end device, if the target tenant chooses a full coverage measurement method; selecting part of potential paths from all potential paths and determining the other end devices on the part of potential paths as the destination end device corresponding to the source end device, if the target tenant chooses a selective measurement method.

In an optional embodiment, as shown in FIG. 4, the apparatus further includes: a configuration module 46 configured for presenting a human-computer interaction interface to the target tenant, wherein a measurement method option is provided on the human-computer interaction interface for the target tenant to select; determining, in response to a selection operation initiated by the target tenant on the measurement method option, a measurement method selected by the target tenant, wherein the measurement method selected by the target tenant is a full coverage measurement method or a selective measurement method.

In an optional embodiment, the message injection module 44 is specifically configured for: sending the measurement request message to a source network element device on the path to be measured, and forwarding the measurement request message, starting from the source network element device to other network element devices on the path to be measured, so that the source network element device and the other network element devices generate the measurement record information.

In an optional embodiment, the message generation module 43 is specifically configured for: generating a protocol header in the measurement request message according to information of the source end device and the destination end device; generating a measurement header in the measurement request message according to an identifier of the target tenant, detailed information of a source network element device, and a first timestamp; generating the measurement request message according to the protocol header and the measurement header, wherein the first timestamp indicates the time point at which the measurement request message is sent.

It should be noted here that the network quality measurement apparatus of the present embodiment may be implemented by distributing and deploying in the cloud network. Specifically, the intent perception module 41, the rule generation module 42 and the quality analysis module 45 may be independently deployed in the cloud network, while the message generation module 43 and the message injection module 44 may be implemented by deploying in a network element device in the cloud network. Further, optionally, in a case where the message generation module 43 and the message injection module 44 are implemented by deploying in a network element device, the message generation module 43 and the message injection module 44 may be implemented as one module.

In a case where the message generation module 43 and the message injection module 44 are implemented by deploying in a source network element device, the message generation module 43 or the message injection module 44 are further configured for generating measurement record information. Specifically, the message generation module 43 or the message injection module 44 record at least one of the following information: an identifier of a tenant to which a network element itself belongs, detailed information of a network element itself, a second timestamp of receiving the measurement request message, and a third timestamp of forwarding the measurement request message, to generate the path record information.

Further, optionally, the message generation module 43 or the message delivering module 44 may also receive a measurement reply message sent by other network element devices, the measurement reply message including a first timestamp; and generate delay record information according to the first timestamp in the measurement reply message and a fourth timestamp of receiving the measurement reply message.

In an optional embodiment, the quality analysis module 45 is specifically configured for: analyzing network delay and packet loss rate from at least one dimension of the path to be measured, the target tenant and the cloud network, according to the above delay record information and path record information.

The internal functions and structure of the network quality measurement apparatus are described above, as shown in FIG. 5. In practice, the network quality measurement apparatus may be implemented as a cloud computing device, including a memory 51, a processor 52 and a communication component 53.

The memory 51 is configured for storing computer programs and may be configured for storing various other data to support operations on the cloud computing device. Examples of such data include instructions, messages, pictures, videos, etc. of any application or method operated on the cloud computing device.

The processor 52, coupled to the memory 51, is configured for executing the computer programs in the memory 51, to: perceive a measurement intent of a target user in a cloud network and generate a measurement rule that complies with the measurement intent, the measurement rule including a source end device and a destination end device on a path to be measured; generate a measurement request message according to the measurement rule, and deliver the measurement request message into the path to be measured, so that at least part of network element devices on the path to be measured generate measurement record information; perform network quality analysis according to the measurement record information generated by the at least part of network element devices.

In an optional embodiment, when perceiving the measurement intent, the processor 52 is specifically configured for: generating network topology change information of the target tenant according to application requirement change information submitted by the target tenant; determining the measurement intent of the target tenant according to the network topology change information.

In an optional embodiment, when generating the measurement rule, the processor 52 is specifically configured for: determining the source end device and the destination end device on the path to be measured according to the measurement intent of the target tenant and network configuration information of the target tenant; generating the measurement rule according to the source end device and the destination end device on the path to be measured.

Further, optionally, when determining the source end device and the destination end device on the path to be measured, the processor 52 is specifically configured for: analyzing a source end device to be measured from the measurement intent of the target tenant; obtaining a potential path that has an access relationship with the source end device according to a network topology where the source end device is located, in combination with the network configuration information of the target tenant; determining a destination end device corresponding to the source end device from another end device on the potential path.

Furthermore, when determining the destination end device corresponding to the source end device, the processor 52 is specifically configured for: determining the other end devices on all potential paths as the destination end device corresponding to the source end device, if the target tenant chooses a full coverage measurement method; selecting part of potential paths from all potential paths and determining the other end devices on the part of potential paths as the destination end device corresponding to the source end device, if the target tenant chooses a selective measurement method.

In an optional embodiment, the processor 52 is further configured for: presenting a human-computer interaction interface to the target tenant, wherein a measurement method option is provided on the human-computer interaction interface for the target tenant to select; determining, in response to a selection operation initiated by the target tenant on the measurement method option, a measurement method selected by the target tenant, wherein the measurement method selected by the target tenant is a full coverage measurement method or a selective measurement method.

In an optional embodiment, when delivering the measurement request message into the path to be measured, the processor 52 is specifically configured for: sending the measurement request message to a source network element device on the path to be measured, and forwarding the measurement request message, starting from the source network element device to other network element devices on the path to be measured, so that the source network element device and the other network element devices generate the measurement record information.

In an optional embodiment, when generating the measurement request message, the processor 52 is specifically configured for: generating a protocol header in the measurement request message according to information of the source end device and the destination end device; generating a measurement header in the measurement request message according to an identifier of the target tenant, detailed information of a source network element device, and a first timestamp; generating the measurement request message according to the protocol header and the measurement header, wherein the first timestamp indicates a time point at which the measurement request message is sent.

It should be noted here that the cloud computing device of the present embodiment may be implemented by distributing and deploying in the cloud network. Specifically, functions of generation and injection of a measurement message may be implemented by distributing and deploying in a network element device in the cloud network. Based on this, the processor 52 is further configured for generating measurement record information. The processor 52 is specifically configured for recording at least one of the following information: an identifier of a tenant to which a network element itself belongs, detailed information of a network element itself, a second timestamp of receiving the measurement request message, and a third timestamp of forwarding the measurement request message, to generate path record information.

Further, optionally, for the source network element device, the processor 52 is configured for: receiving a measurement reply message sent by other network element devices, the measurement reply message including a first timestamp; and generating delay record information according to the first timestamp in the measurement reply message and a fourth timestamp of receiving the measurement reply message.

In an optional embodiment, when performing the network quality analysis, the processor 52 is specifically configured for: analyzing network delay and packet loss rate from at least one dimension of the path to be measured, the target tenant and the cloud network, according to the above delay record information and path record information.

Figure 5:
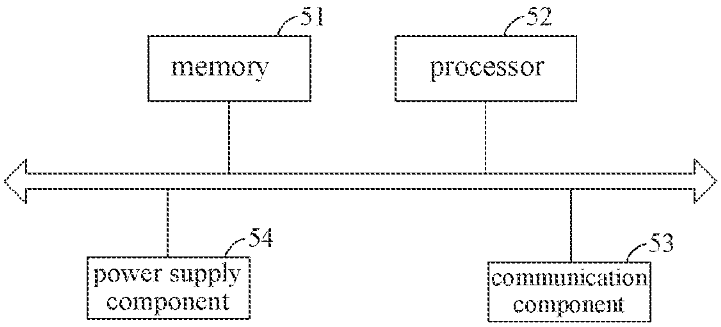
FIG. 5 is a schematic structural diagram of a cloud computing device provided by an exemplary embodiment of the present application.

Further, as shown in FIG. 5, the cloud computing device further includes a power supply component 54 and other components, etc. FIG. 5 only shows part of components schematically, which does not mean that the cloud computing device only includes the components shown in FIG. 5.

Correspondingly, an embodiment of the present application further provides a computer-readable storage medium storing computer programs. The computer programs, when executed by a processor, enable the processor to implement each step in the above method embodiments.

Correspondingly, an embodiment of the present application further provides a computer program product, including computer programs/instructions. The computer programs/instructions, when executed by a processor, enable the processor to implement each step in the above method embodiment.

The memory in above embodiments may be implemented by any type of volatile or non-volatile storage device or their combination, such as a static random-access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The communication component in above embodiments is configured to facilitate wired or wireless communication between a device where the communication component is located and other devices. The device where the communication component is located may access a wireless network based on a communication standard, such as WiFi, 2G, 3G, 4G/LTE, 5G and other mobile communication networks, or a combination thereof. In an exemplary embodiment, the communication component receives a broadcast signal or broadcast related information from an external broadcast management system via a broadcast channel. In an exemplary embodiment, the communication component further includes a near field communication (NFC) module to facilitate short range communication. For example, the NFC module may be implemented based on radio frequency identification (RFID) technology, infrared data association (IrDA) technology, ultra-wide band (UWB) technology, Bluetooth (BT) technology and other technologies.

The power supply component in above embodiments provides power for various components of a device where the power supply component is located. The power component may include a power supply management system, one or more power supplies, and other components associated with generating, managing, and distributing power to a device where the power component is located.

Those skilled in the art should understand that embodiments of the present application may be provided as a method, a system, or a computer program product. Accordingly, the present application may take the form of an entire hardware embodiment, an entire software embodiment, or an embodiment that combines software and hardware aspects. Furthermore, the present application may take the form of a computer program product embodied in one or more computer-usable storage medium (including, but not limited to, a disk storage, a CD-ROM, an optical storage, etc.) including computer-usable program codes therein.

The present application is described with reference to flowcharts and/or block diagrams of methods, apparatus (systems), and computer program products according to embodiments of the present application. It should be understood that each process and/or each block in a flowchart and/or a block diagram, and a combination of processes and/or blocks in a flowchart and/or a block diagram may be implemented by computer program instructions. These computer program instructions may be provided to a processor of a general-purpose computer, a special purpose computer, an embedded processor, or other programmable data processing devices to produce a machine, so that the instructions executed by the processor of the computer or other programmable data processing devices produce an apparatus used for realizing functions specified in one or more processes in a flowchart and/or one or more blocks in a block diagram.

These computer program instructions may also be stored in a computer-readable memory that can guide a computer or other programmable data processing devices to operate in a specific manner, so that the instructions stored in the computer-readable memory produce an article of manufacture that includes an instruction apparatus. Such instruction apparatus implements the functions specified in one or more processes in a flowchart and/or one or more blocks in a block diagram.

These computer program instructions may also be loaded into a computer or other programmable data processing devices, so that a series of operations and steps are executed in the computer or other programmable devices to produce computer-implemented processing, so that the instructions executed in the computer or other programmable devices provide steps for implementing the functions specified in one or more processes in a flowchart and/or one or more blocks in a block diagram.

In a typical configuration, a computing device includes one or more processors (CPU), input/output interfaces, network interfaces, and a memory.

The memory may include a non-permanent memory, a random-access memory (RAM), and/or a non-volatile memory in a computer-readable medium, such as a read only memory (ROM) or a flash memory (flash RAM). Memory is an example of the computer-readable medium.

The computer-readable medium includes a permanent or non-permanent, removable or non-removable media that may implement information storage by any method or technology. Information may be computer-readable instructions, data structures, program modules, or other data. Examples of computer storage medium include, but are not limited to, a phase change memory (PRAM), a static random-access memory (SRAM), a dynamic random-access memory (DRAM), other types of random-access memory (RAM), a read only memory (ROM), an electrically erasable programmable read only memory (EEPROM), a flash memory or other memory technologies, a compact disc read only memory (CD-ROM), a digital versatile disc (DVD) or other optical storage, a cassette tape, a magnetic tape magnetic disk storage or other magnetic storage device or any other non-transmission medium, which may be used to store information that can be accessed by a computing device. As defined herein, the computer-readable medium does not include a transitory computer-readable media (transitory media), such as modulated data signals and carrier waves.

It should also be noted that terms "including", "containing" or any other variants thereof are intended to cover a non-exclusive inclusion, so that a process, method, article, or device that includes a series of elements includes not only those elements, but also other elements that are not explicitly listed, or also include elements that are inherent to this process, method, article, or device. Without more restrictions, an element defined by a sentence "including a . . . " does not exclude the existence of other identical elements in a process, method, article, or device that includes such an element.

The above described are only embodiments of the present application and are not intended to limit the present application. For those skilled in the art, various modifications and variations may be made to the present application. Any modifications, equivalent substitutions, improvements, etc. made within the spirit and principle of the present application shall be included in the scope of claims of the present application.

What is claimed is:

1. A cloud network, comprising a physical network and a virtual network hosted on the physical network; the virtual network comprising a multi-tenant network and network element devices responsible for traffic forwarding and interconnection between different end devices in the multi-tenant network; the cloud network further comprising a scheduling device and an analysis device;

the scheduling device being configured for perceiving a measurement intent of a target tenant, generating a measurement rule that complies with the measurement intent and delivering the measurement rule to a source network element device, wherein the measurement rule comprises a source end device and a destination end device on a path to be measured, and the source network element device is a network element device on the path to be measured;

the source network element device being configured for generating a measurement request message according to the measurement rule and forwarding the measurement request message, wherein the measurement request message is used for enabling the source network element device and other network element devices on the path to be measured that receive the measurement request message to generate measurement record information;

the analysis device being configured for performing network quality analysis according to the measurement record information generated by the source network element device and the other network element devices, wherein the virtual network further comprises a network controller, the network controller being configured to provide a subscription service to the scheduling device, and the scheduling device is registered as a subscriber of the network controller to subscribe to application requirement change information submitted by the target tenant.

2. The cloud network of claim 1, wherein the source network element device is a first network element device on the path to be measured which is directly connected to the source end device; the measurement request message is forwarded, starting from the first network element device to a target network element device, and the target network element device is a second network element device on the path to be measured which is directly connected to the destination end device.

3. A measurement system for a cloud network, comprising a scheduling subsystem, at least one measurement execution subsystem, and a measurement analysis subsystem;

the scheduling subsystem being in communication connection with a network controller in the cloud network, the network controller being a portal for interaction between the target tenant and a cloud network provider, and the scheduling subsystem being configured to obtain application requirement change information submitted by the target tenant from the network controller;

the scheduling subsystem being configured for perceiving a measurement intent of a target tenant in the cloud network, generating a measurement rule that complies with the measurement intent and delivering the measurement rule to a target measurement execution subsystem, wherein the measurement rule comprises a source end device and a destination end device on a path to be measured, and the target measurement execution subsystem corresponds to the path to be measured;

the target measurement execution subsystem being configured for generating a measurement request message according to the measurement rule, delivering the measurement request message into the path to be measured, so that at least part of network element devices on the path to be measured forward the measurement request message and generate measurement record information;

the measurement analysis subsystem being configured for performing network quality analysis according to the measurement record information generated by the at least part of network element devices.

4. A network quality measurement method, comprising:

perceiving a measurement intent of a target tenant in a cloud network, and generating a measurement rule that complies with the measurement intent, wherein the measurement rule comprises a source end device and a destination end device on a path to be measured, wherein perceiving the measurement intent of the target tenant comprises obtaining, by a scheduling device in communication connection with a network controller in the cloud network, application requirement change information submitted by the target tenant from the network controller, wherein the network controller provides a subscription service to the scheduling device, and the scheduling device is registered as a subscriber of the network controller to subscribe to the application requirement change information submitted by the target tenant;

generating a measurement request message according to the measurement rule, and delivering the measurement request message into the path to be measured, so that at least part of network element devices on the path to be measured generate measurement record information;

performing network quality analysis according to the measurement record information generated by the at least part of network element devices.

5. The method of claim 4, wherein perceiving the measurement intent of the target tenant in the cloud network comprises:

generating network topology change information of the target tenant according to application requirement change information submitted by the target tenant;

determining the measurement intent of the target tenant according to the network topology change information.

6. The method of claim 5, wherein generating the measurement rule that complies with the measurement intent comprises:

determining the source end device and the destination end device on the path to be measured according to the measurement intent of the target tenant and network configuration information of the target tenant;

generating the measurement rule according to the source end device and the destination end device on the path to be measured.

7. The method of claim 6, wherein determining the source end device and the destination end device on the path to be measured according to the measurement intent of the target tenant and the network configuration information of the target tenant comprises:

analyzing a source end device to be measured from the measurement intent of the target tenant;

obtaining a potential path that has an access relationship with the source end device according to a network topology where the source end device is located, in combination with the network configuration information of the target tenant;

determining a destination end device corresponding to the source end device from another end device on the potential path.

8. The method of claim 4, wherein delivering the measurement request message into the path to be measured, so that the at least part of network element devices on the path to be measured generate the measurement record information, comprises:

sending the measurement request message to a source network element device on the path to be measured, and forwarding the measurement request message, starting from the source network element device to other network element devices on the path to be measured, so that the source network element device and the other network element devices generate the measurement record information.

9. The method of claim 8, wherein generating the measurement request message according to the measurement rule comprises:

generating a protocol header in the measurement request message according to information of the source end device and the destination end device;

generating a measurement header in the measurement request message according to an identifier of the target tenant, detailed information of the source network element device, and a first timestamp;

generating the measurement request message according to the protocol header and the measurement header, wherein the first timestamp indicates a time point at which the measurement request message is sent.

10. The method of claim 9, wherein generating the measurement record information by the source network element device and the other network element devices comprises:

recording at least one of following information: an identifier of a tenant to which a network element itself belongs, detailed information of a network element itself, a second timestamp of receiving the measurement request message, and a third timestamp of forwarding the measurement request message, to generate path record information, wherein generating the measurement record information by the source network element device further comprises: receiving a measurement reply message sent by the other network element devices, the measurement reply message comprising the first timestamp; generating delay record information according to the first timestamp in the measurement reply message and a fourth timestamp of receiving the measurement reply message;

performing the network quality analysis according to the measurement record information generated by the at least part of network element devices correspondingly, comprises: analyzing network delay and packet loss rate from at least one dimension of the path to be measured, the target tenant and the cloud network, according to the delay record information and the path record information.

11. A cloud computing device, comprising a memory and a processor, wherein the memory stores computer programs, which, when executed by the processor, cause the processor to implement operations of:

perceiving a measurement intent of a target tenant in a cloud network, and generating a measurement rule that complies with the measurement intent, wherein the measurement rule comprises a source end device and a destination end device on a path to be measured, wherein perceiving the measurement intent of the target tenant comprises obtaining, by a scheduling device in communication connection with a network controller in the cloud network, application requirement change information submitted by the target tenant from the network controller, wherein the network controller provides a subscription service to the scheduling device, and the scheduling device is registered as a subscriber of the network controller to subscribe to the application requirement change information submitted by the target tenant;

generating a measurement request message according to the measurement rule, and delivering the measurement request message into the path to be measured, so that at least part of network element devices on the path to be measured generate measurement record information;

performing network quality analysis according to the measurement record information generated by the at least part of network element devices.

12. A non-transitory computer-readable storage medium storing computer programs, wherein the computer programs, when executed by a processor, enable the processor to implement operations of:

perceiving a measurement intent of a target tenant in a cloud network, and generating a measurement rule that complies with the measurement intent, wherein the measurement rule comprises a source end device and a destination end device on a path to be measured, wherein perceiving the measurement intent of the target tenant comprises obtaining, by a scheduling device in communication connection with a network controller in the cloud network, application requirement change information submitted by the target tenant from the network controller, wherein the network controller provides a subscription service to the scheduling device, and the scheduling device is registered as a subscriber of the network controller to subscribe to the application requirement change information submitted by the target tenant;

generating a measurement request message according to the measurement rule, and delivering the measurement request message into the path to be measured, so that at least part of network element devices on the path to be measured generate measurement record information;

performing network quality analysis according to the measurement record information generated by the at least part of network element devices.

13. The cloud computing device of claim 11, wherein the operations of perceiving the measurement intent of the target user in the cloud network comprises:

generating network topology change information of the target tenant according to application requirement change information submitted by the target tenant;

determining the measurement intent of the target tenant according to the network topology change information.

14. The cloud computing device of claim 13, wherein the operations of generating the measurement rule that complies with the measurement intent comprises:

determining the source end device and the destination end device on the path to be measured according to the measurement intent of the target tenant and network configuration information of the target tenant;

generating the measurement rule according to the source end device and the destination end device on the path to be measured.

15. The cloud computing device of claim 14, wherein the operation of determining the source end device and the destination end device on the path to be measured according to the measurement intent of the target tenant and the network configuration information of the target tenant comprises:

analyzing a source end device to be measured from the measurement intent of the target tenant;

obtaining a potential path that has an access relationship with the source end device according to a network topology where the source end device is located, in combination with the network configuration information of the target tenant;

determining a destination end device corresponding to the source end device from another end device on the potential path.

16. The cloud computing device of claim 11, wherein the operation of delivering the measurement request message into the path to be measured, so that the at least part of network element devices on the path to be measured generate the measurement record information, comprises:

sending the measurement request message to a source network element device on the path to be measured, and forwarding the measurement request message, starting from the source network element device to other network element devices on the path to be measured, so that the source network element device and the other network element devices generate the measurement record information.

17. The cloud computing device of claim 16, wherein the operation of generating the measurement request message according to the measurement rule comprises:

generating a protocol header in the measurement request message according to information of the source end device and the destination end device;

generating a measurement header in the measurement request message according to an identifier of the target tenant, detailed information of the source network element device, and a first timestamp;

generating the measurement request message according to the protocol header and the measurement header, wherein the first timestamp indicates a time point at which the measurement request message is sent.

18. The cloud computing device of claim 16, wherein the operation of generating the measurement record information by the source network element device and the other network element devices comprises:

recording at least one of following information: an identifier of a tenant to which a network element itself belongs, detailed information of a network element itself, a second timestamp of receiving the measurement request message, and a third timestamp of forwarding the measurement request message, to generate path record information, wherein generating the measurement record information by the source network element device further comprises: receiving a measurement reply message sent by the other network element devices, the measurement reply message comprising the first timestamp; generating delay record information according to the first timestamp in the measurement reply message and a fourth timestamp of receiving the measurement reply message;

performing the network quality analysis according to the measurement record information generated by the at least part of network element devices correspondingly, comprises: analyzing network delay and packet loss rate from at least one dimension of the path to be measured, the target tenant and the cloud network, according to the delay record information and the path record information.

19. The method of claim 5, wherein delivering the measurement request message into the path to be measured, so that the at least part of network element devices on the path to be measured generate the measurement record information, comprises:

sending the measurement request message to a source network element device on the path to be measured, and forwarding the measurement request message, starting from the source network element device to other network element devices on the path to be measured, so that the source network element device and the other network element devices generate the measurement record information.

20. The method of claim 6, wherein delivering the measurement request message into the path to be measured, so that the at least part of network element devices on the path to be measured generate the measurement record information, comprises:

sending the measurement request message to a source network element device on the path to be measured, and forwarding the measurement request message, starting from the source network element device to other network element devices on the path to be measured, so that the source network element device and the other network element devices generate the measurement record information.

* * * * *